(12) United States Patent
Uehara

(10) Patent No.: US 11,709,416 B2
(45) Date of Patent: Jul. 25, 2023

(54) LIGHT SOURCE DEVICE, IMAGE DISPLAY DEVICE, AND PROJECTOR

(71) Applicant: SEIKO EPSON CORPORATION, Tokyo (JP)

(72) Inventor: Katsuyuki Uehara, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 45 days.

(21) Appl. No.: 17/410,233

(22) Filed: Aug. 24, 2021

(65) Prior Publication Data

US 2022/0066306 A1 Mar. 3, 2022

(30) Foreign Application Priority Data

Aug. 25, 2020 (JP) .................... 2020-141418

(51) Int. Cl.
*G03B 21/20* (2006.01)
*G03B 33/12* (2006.01)

(52) U.S. Cl.
CPC ......... *G03B 21/208* (2013.01); *G03B 21/204* (2013.01); *G03B 33/12* (2013.01)

(58) Field of Classification Search
None
See application file for complete search history.

(56) References Cited

U.S. PATENT DOCUMENTS

| | | | |
|---|---|---|---|
| 2004/0223121 A1 | 11/2004 | Koide | |
| 2006/0197926 A1 | 9/2006 | Koide | |
| 2006/0290892 A1 | 12/2006 | Koide | |
| 2011/0234998 A1 | 9/2011 | Kurosaki | |
| 2012/0249974 A1 | 10/2012 | Ogino | |
| 2016/0373704 A1 | 12/2016 | Akiyama | |
| 2019/0094672 A1* | 3/2019 | Akiyama | ........... G03B 21/2013 |

FOREIGN PATENT DOCUMENTS

| | | |
|---|---|---|
| CN | 101008713 A | 8/2007 |
| CN | 106257329 A | 12/2016 |
| JP | 2011-197597 A | 10/2011 |
| JP | 2012-203366 A | 10/2012 |
| JP | 2017-194523 A | 10/2017 |
| JP | 2019-028120 A | 2/2019 |

* cited by examiner

*Primary Examiner* — Bao-Luan Q Le
*Assistant Examiner* — Danell L Owens
(74) *Attorney, Agent, or Firm* — Oliff PLC

(57) ABSTRACT

A light source device includes a light emitting element, and a microlens array having a first multi-lens surface and a second multi-lens surface. The light which enters the first multi-lens surface has an angular distribution. The first multi-lens surface has a plurality of first cells arranged in an array, and the second multi-lens surface has a plurality of second cells arranged in an array. Light proceeding from one of the first cells toward the second multi-lens surface has a first light beam which enters one second cell, and a second light beam which enters another second cell different from the one second cell. A first area of an illumination target is irradiated with the first light beam, and a second area of the illumination target different from the first area is irradiated with the second light beam.

18 Claims, 14 Drawing Sheets

LIGHT SOURCE DEVICE, IMAGE DISPLAY DEVICE, AND PROJECTOR

The present application is based on, and claims priority from JP Application Serial Number 2020-141418, filed Aug. 25, 2020, the disclosure of which is hereby incorporated by reference herein in its entirety.

BACKGROUND

1. Technical Field

The present disclosure relates to a light source device, an image display device, and a projector.

2. Related Art

In a field of an image display device such as a projector, there is proposed a light source device using fluorescence emitted from a phosphor when irradiating the phosphor with excitation light emitted from a light source. In the light source device of this kind, in order to homogenize the illuminance distribution of the excitation light on the phosphor, there is used a microlens array in some cases.

In JP-A-2011-197597 (Document 1), there is disclosed a light source unit provided with an excitation light source, a phosphor plate for emitting green light when receiving the excitation light, a microlens array, a red light source, and a blue light source. In this light source unit, the microlens array has a configuration in which a plurality of microconvex lenses is arranged in an array, and is disposed between the excitation light source and the phosphor plate. The excitation light emitted from the excitation light source is divided by the microlens array into a plurality of light beams, and the phosphor plate is irradiated with the plurality of light beams so as to be superimposed on the phosphor plate to thereby be illuminated with substantially homogenous illuminance. However, in this configuration, there is a problem that the wavelength conversion efficiency decreases with rise in temperature of the phosphor.

As a method of increasing the wavelength conversion efficiency of the phosphor, in JP-A-2019-28120 (Document 2), there is disclosed an illumination device provided with a light source, a lens array disposed on a light path of excitation light emitted from the light source, and a wavelength conversion element for emitting a plurality of fluorescent beams in response to a plurality of partial light beams emitted from the lens array. In this illumination device, the plurality of partial light beams emitted from the lens array enters a plurality of areas different from each other in the wavelength conversion element without being superimposed on the wavelength conversion element.

In the illumination device in Document 2, the partial light beam emitted from one of the lenses constituting the lens array enters one of the areas of the wavelength conversion element thus divided. As described above, in the illumination device in Document 2, since one of the lenses of the lens array and one of the areas of the wavelength conversion element correspond to each other, there is a possibility that the optical system of the illumination device including the lens array and the wavelength conversion element grows in size, and at the same time, illuminance unevenness on the wavelength conversion element increases.

Although there is hereinabove described when the illumination target is the wavelength conversion element, even when the lens array described in Document 2 is applied when the illumination target is a light modulation device such as a liquid crystal panel, there is substantially the same problem as described above such as the growth in size of the optical system and the illuminance unevenness.

SUMMARY

In view of the problems described above, a light source device according to an aspect of the present disclosure includes a light emitting element configured to emit light, and a microlens array having a first multi-lens surface which the light emitted from the light emitting element enters, and a second multi-lens surface configured to emit the light which enters through the first multi-lens surface, wherein the light which enters the first multi-lens surface has an angular distribution, the first multi-lens surface has a plurality of first cells arranged in an array, the second multi-lens surface has a plurality of second cells arranged in an array, light proceeding from one of the first cells toward the second multi-lens surface has a first light beam which enters one second cell, and a second light beam which enters another second cell different from the one second cell, a first area of an illumination target is irradiated with the first light beam, and a second area of the illumination target different from the first area is irradiated with the second light beam.

An image display device according to another aspect of the present disclosure includes the light source device according to the aspect of the present disclosure, and a light modulation device configured to modulate light emitted from the light source device in accordance with image information.

A projector according to still another aspect of the present disclosure includes the light source device according to the aspect of the present disclosure, a light modulation device configured to modulate light emitted from the light source device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 5.

It should be noted that in each of the drawings described below, the constituents are shown with the scale ratios of respective sizes set differently between the constituents in some cases in order to facilitate the visualization of each of the constituents.

Configuration of Projector

An example of a projector according to the present embodiment will be described.

Figure 1:
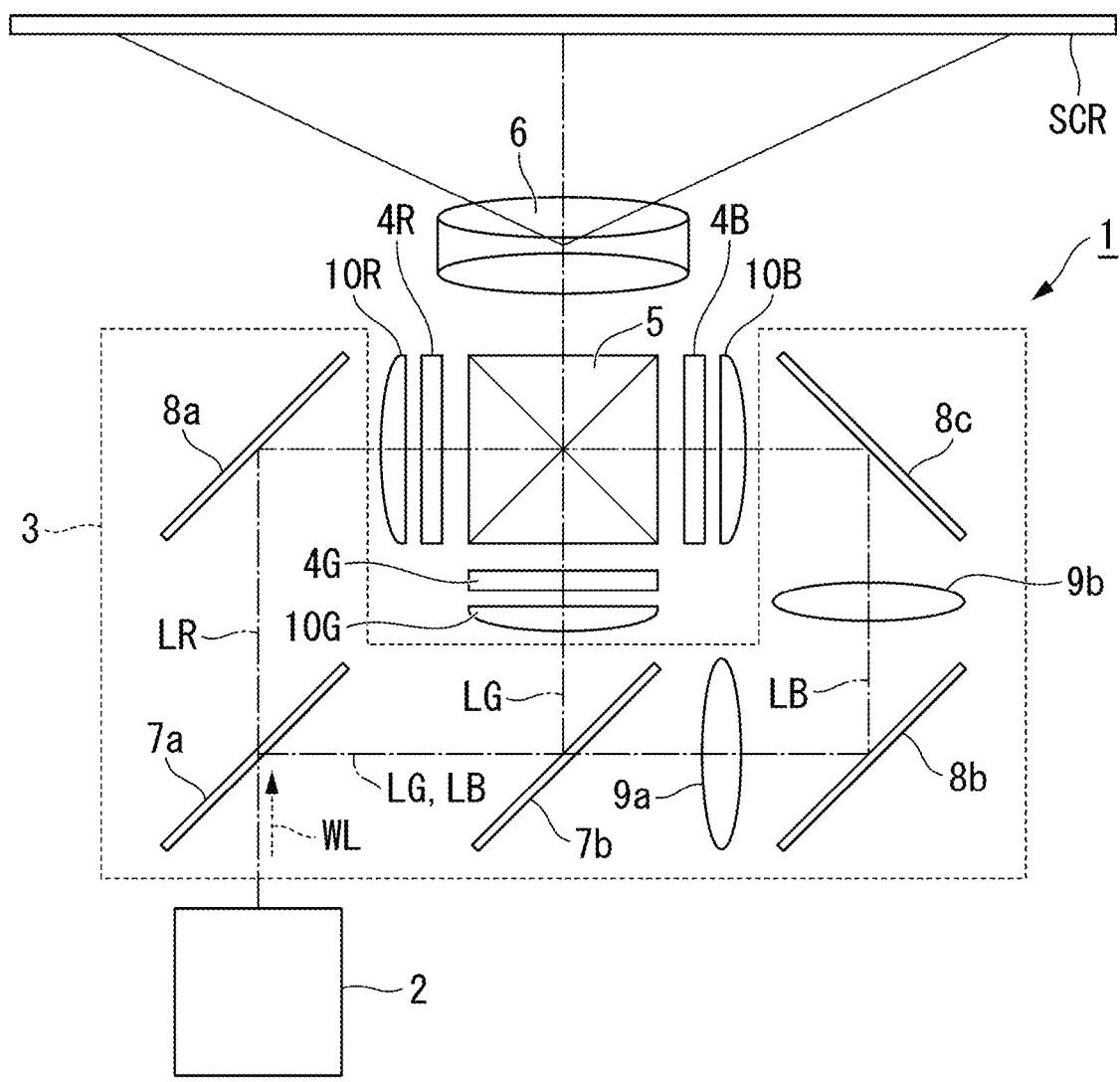
FIG. 1 is a schematic configuration diagram of a projector according to a first embodiment.

FIG. 1 is a diagram showing a schematic configuration of the projector 1 according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. The configuration of the illumination device 2 will be described later in detail.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates the illumination light WL having been emitted from the illumination device 2 into red light LR, green light LG, and blue light LB. The color separation optical system 3 guides the red light LR to the light modulation device 4R, guides the green light LG to the light modulation device 4G, and guides the blue light LB to the light modulation device 4B.

A field lens 10R is disposed between the color separation optical system 3 and the light modulation device 4R. The field lens 10R substantially collimates the incident light, and emits the result toward the light modulation device 4R. A field lens 10G is disposed between the color separation optical system 3 and the light modulation device 4G. The field lens 10G substantially collimates the incident light, and emits the result toward the light modulation device 4G. A field lens 10B is disposed between the color separation optical system 3 and the light modulation device 4B. The field lens 10B substantially collimates the incident light, and emits the result toward the light modulation device 4B.

The first dichroic mirror 7a transmits a red light component, and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR transmitted through the first dichroic mirror 7a is reflected by the reflecting mirror 8a, and is then transmitted through the field lens 10R to enter an image formation area of the light modulation device 4R for the red light. The green light LG reflected by the first dichroic mirror 7a is further reflected by the second dichroic mirror 7b, and is then transmitted through the field lens 10G to enter an image formation area of the light modulation device 4G for the green light. The blue light LB which is reflected by the first dichroic mirror 7a, and is then transmitted through the second dichroic mirror 7b enters an image formation area of the light modulation device 4B for the blue light via the relay lens 9a, the reflecting mirror 8b at the incident side, the relay lens 9b, the reflecting mirror 8c at the exit side, and the field lens 10B.

The light modulation device 4R, the light modulation device 4G, and the light modulation device 4B each modulate the colored light having entered the light modulation device in accordance with image information to thereby form image light. The light modulation device 4R, the light modulation device 4G, and the light modulation device 4B are each formed of a liquid crystal light valve. Although not shown in the drawings, at the light incident side of each of the light modulation device 4R, the light modulation device 4G, and the light modulation device 4B, there is disposed an incident side polarization plate. At the light exit side of each of the light modulation device 4R, the light modulation device 4G, and the light modulation device 4B, there is disposed an exit side polarization plate.

The combining optical system 5 combines red image light emitted from the light modulation device 4R, green image light emitted from the light modulation device 4G, and blue image light emitted from the light modulation device 4B with each other to form full-color image light. The combining optical system 5 is formed of a cross dichroic prism which has four right triangular prisms bonded to each other, and which has a substantially square shape in a plan view. On the boundary surfaces on which the right triangular prisms are bonded to each other, there are formed dielectric multilayer films.

The image light emitted from the combining optical system 5 is projected by the projection optical device 6 in an enlarged manner to form an image on the screen SCR. In other words, the projection optical device 6 projects the full-color image light emitted from the light modulation device 4R, the light modulation device 4G, and the light modulation device 4B. The projection optical device 6 is constituted by a plurality of projection lenses.

Configuration of Illumination Device

An example of the illumination device 2 according to the present embodiment will be described.

Figure 2:
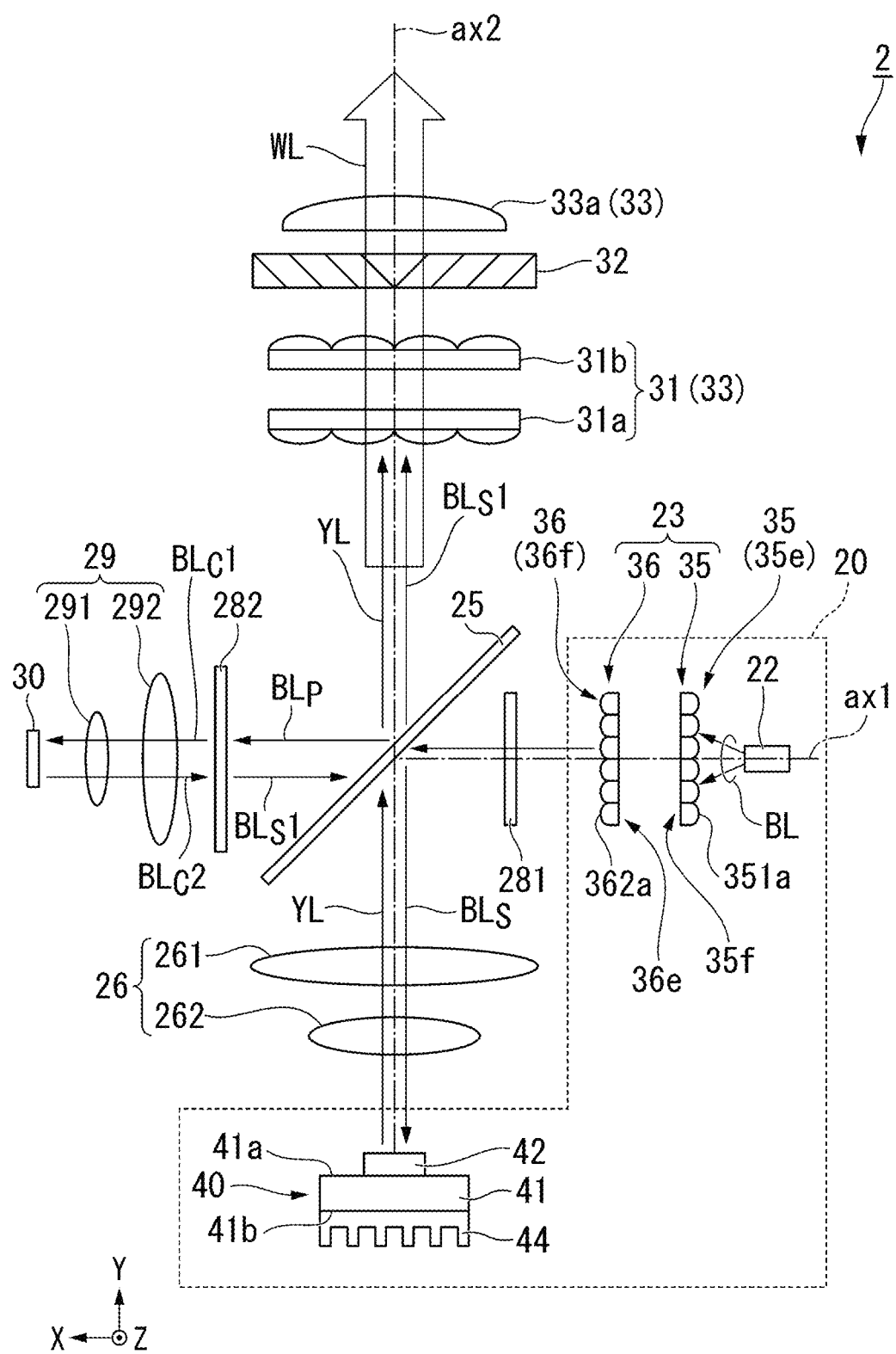
FIG. 2 is a schematic configuration diagram of an illumination device according to the first embodiment.

FIG. 2 is a diagram showing a schematic configuration of the illumination device 2.

As shown in FIG. 2, the illumination device 2 according to the present embodiment is provided with a light source device 20, a first wave plate 281, a polarization split element 25, a first light collection optical system 26, a second wave plate 282, a second light collection optical system 29, a diffusely reflecting element 30, an integrator optical system 31, a polarization conversion element 32, and a superimposing lens 33a. The integrator optical system 31 and the superimposing lens 33a constitute a superimposing optical system 33.

The light source device 20 according to the present embodiment is provided with a light emitting element 22, a microlens array 23, and a wavelength conversion element 40.

In FIG. 2, using an XYZ orthogonal coordinate system, an axis along a principal ray of light BL emitted from the light emitting element 22 is defined as an optical axis ax1 of the light emitting element 22, and an axis parallel to the optical axis ax1 is defined as an X axis. An axis along a principal ray of fluorescence YL emitted from the wavelength conversion element 40 is defined as an optical axis ax2 of the wavelength conversion element 40, and an axis parallel to the optical axis ax2 is defined as a Y axis. Further, an axis perpendicular to the X axis and the Y axis is defined as a Z axis.

The light emitting element 22, the microlens array 23, the first wave plate 281, the polarization split element 25, the second wave plate 282, the second light collection optical system 29, and the diffusely reflecting element 30 are arranged side by side in series on the optical axis ax1 of the light emitting element 22. The wavelength conversion element 40, the first light collection optical system 26, the polarization split element 25, the integrator optical system 31, the polarization conversion element 32, and the superimposing lens 33*a* are arranged side by side in series on the optical axis ax2 of the wavelength conversion element 40. The optical axis ax1 and the optical axis ax2 are located in the same plane, and are perpendicular to each other.

The light emitting element 22 is formed of a semiconductor laser chip for emitting the light BL. The semiconductor laser chip emits blue light, specifically, the light BL having a peak wavelength of, for example, 460 nm.

Figure 3:
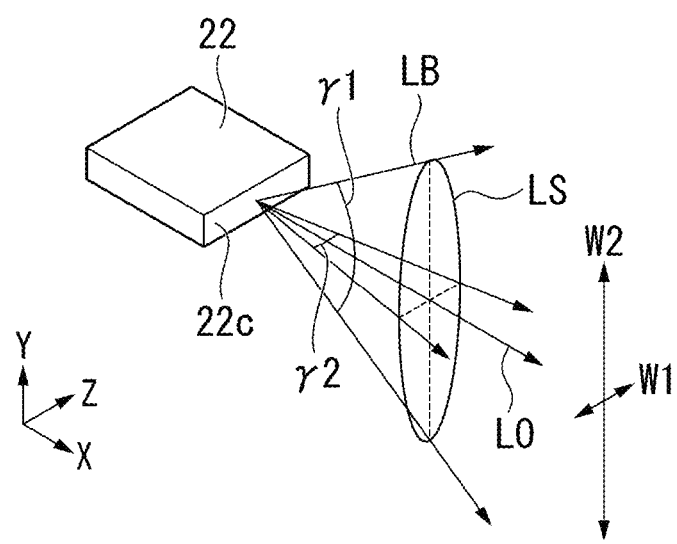
FIG. 3 is a perspective view of a light emitting element.

FIG. 3 is a perspective view of the light emitting element 22.

As shown in FIG. 3, the light emitting element 22 has alight emitting are 22*c* for emitting the light. The light emitting area 22*c* has a rectangular planar shape having a longitudinal direction W1 and a short-side direction W2 viewed from the direction of the principal ray LO of the light LB to be emitted. The ratio (W1/W2) of the longitudinal direction W1 to the short-side direction W2 of the light emitting area 22*c* is, for example, no lower than 30/1. In the present embodiment, the dimension in the longitudinal direction W1 of the light emitting area 22*c* is, for example, 40 μm, and the dimension in the short-side direction W2 of the light emitting area 22*c* is, for example, 1 μm. It should be noted that the shape and the dimensions of the light emitting area 22*c* are not particularly limited.

The light emitting element 22 emits the light LB having a cross section LS shaped like an ellipse having a short axis along the longitudinal direction W1 of the light emitting area 22*c*, and a long axis along the short-side direction W2 of the light emitting area 22*c*. In other words, in the light LB emitted from the light emitting element 22, a divergence angle γ1 in a plane perpendicular to the longitudinal direction W1 of the light emitting area 22*c* is larger than a divergence angle γ2 in a plane perpendicular to the short-side direction W2 of the light emitting area 22*c*. The maximum value of the divergence angle γ1 (the largest emission angle) of the light LB is, for example, 70°. The maximum value of the divergence angle γ2 (the largest emission angle) of the light LB is, for example, 20°. As described above, the light emitting element 22 emits the light BL having the angular distribution.

The light BL emitted from the light emitting element 22 enters the microlens array 23. The microlens array 23 is constituted by a first lens array 35 having a first multi-lens surface 35*a* and a second lens array 36 having a second multi-lens surface 36*a*. The first multi-lens surface 35*a* has a plurality of first cells 351*a* arranged in an array. The second multi-lens surface 36*a* has a plurality of second cells 362*a* arranged in an array. Specifically, the first multi-lens surface 35*a* has 36 first cells 351*a* arranged in, for example, a 6×6 matrix. The second multi-lens surface 36*a* has 36 second cells 362*a* arranged in, for example, a 6×6 matrix. As described above, the number of the first cells 351*a* and the number of the second cells 362*a* are equal to each other. It should be noted that the numbers of the lens surfaces 351*a*, 362*a* constituting the respective multi-lens surfaces 35*a*, 36*a* are not particularly limited.

The first lens array 35 has a first surface 35*e* which the light BL enters, and a second surface 35*f* from which the light BL having entered through the first surface 35*e* is emitted. In the present embodiment, the first multi-lens surface 35*a* is formed of the first surface 35*e*. The second surface 35*f* is formed to have a shape like a plane. It should be noted that the first lens array 35 can be disposed so that the incident side and the exit side are flipped. In other words, the first multi-lens surface 35*a* can be formed of the second surface 35*f* from which the light BL is emitted, and the first surface 35*e* which the light BL enters can be formed to have a shape like a plane.

The second lens array 36 has a third surface 36*e* which the light BL emitted from the second surface 35*f* of the first lens array 35 enters, and a fourth surface 36*f* from which the light BL having entered through the third surface 36*e* is emitted. In the present embodiment, the second multi-lens surface 36*a* is formed of the fourth surface 36*f*. The third surface 36*e* is formed to have a shape like a plane. It should be noted that the second lens array 36 can be disposed so that the incident side and the exit side are flipped from the present embodiment. In other words, the second multi-lens surface 36*a* can be formed of the third surface 36*e* which the light BL enters, and the fourth surface 36*f* from which the light BL is emitted can be formed to have a shape like a plane.

Each of the first lens array 35 and the second lens array 36 can be formed of an inorganic material such as optical glass or quartz, or can also be formed of an organic material such as resin. Further, it is desirable for the first lens array 35 and the second lens array 36 to be held by an arbitrary holding member.

The light BL emitted from the microlens array 23 enters the first wave plate 281. The first wave plate 281 is formed of, for example, a ½ wave plate which is made rotatable. The light BL emitted from the light emitting element 22 is linearly polarized light having a predetermined polarization direction. By appropriately setting the rotational angle of the first wave plate 281, it is possible to convert the light BL transmitted through the first wave plate 281 into the light BL including an S-polarization component and a P-polarization component with respect to the polarization split element 25 at a predetermined rate. By changing the rotational angle of the first wave plate 281, it is possible to adjust the ratio of the S-polarization component to the P-polarization component.

The light BL including the S-polarization component and the P-polarization component emitted from the first wave plate 281 enters the polarization split element 25. The polarization split element 25 is formed of, for example, a polarization beam splitter having wavelength selectivity. The polarization split element 25 is arranged so as to form an angle of 45° with each of the optical axis ax1 and the optical axis ax2.

The polarization split element 25 has a polarization split function of splitting the light BL into light BLs as the S-polarization component with respect to the polarization split element 25 and light BLp as the P-polarization component. Specifically, the polarization split element 25 reflects the light BLs as the S-polarization component to guide the light BLs to the wavelength conversion element 40, and transmits the light BLp as the P-polarization component to guide the light BLp to the diffusely reflecting element 30. Further, the polarization split element 25 has a color separation function of transmitting a yellow light component different in wavelength band from the light BL having a blue color irrespective of the polarization state in addition to the polarization split function.

The light BLs as the S-polarized light having been reflected by the polarization split element 25 enters the first light collection optical system 26. The light BLs emitted from the polarization split element 25 enters the first light collection optical system 26, and the first light collection optical system 26 converges the light BLs toward the wavelength conversion element 40. The first light collection optical system 26 is constituted by a first lens 261 and a second lens 262. The first lens 261 and the second lens 262 are each formed of a convex lens. The light BLs having been emitted from the first light collection optical system 26 enters the wavelength conversion element 40 in a converged state.

The wavelength conversion element 40 is provided with a base member 41, a wavelength conversion layer 42, and a heatsink 44. In the present embodiment, the wavelength conversion layer 42 is formed of a phosphor. In the present embodiment, as the wavelength conversion element 40, there is used a stationary wavelength conversion element which does not have a drive source such as a motor, and is not made rotatable. The light BLs converged by the first lens 261 and the second lens 262 enters the wavelength conversion element 40. A part of the light BL emitted by the light emitting element 22 is excitation light, and the excitation light enters the microlens array 23. The excitation light emitted from the microlens array 23 enters the wavelength conversion element 40, and the wavelength conversion element 40 performs the wavelength conversion on the excitation light to emit the fluorescence YL.

The wavelength conversion layer 42 includes a ceramic phosphor for converting the light BLs into the fluorescence YL in a second wavelength band different from the first wavelength band. The second wavelength band is in a range of, for example, 490 through 750 nm, and the fluorescence YL is yellow light including the green light component and the red light component. The wavelength conversion layer 42 includes, for example, an yttrium aluminum garnet (YAG) type phosphor. Citing YAG:Ce including cerium (Ce) as an activator agent as an example, as the wavelength conversion layer 42, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process. Further, it is possible for the wavelength conversion layer 42 to include a scattering element made of, for example, a plurality of bubbles. The wavelength conversion layer 42 includes the scattering element to thereby make it possible to enhance the extraction efficiency of the fluorescence YL.

The wavelength conversion layer 42 is bonded to a first surface 41a of the base member 41 with a bonding material (not shown). As the bonding material, there is used, for example, a nano-silver sintered metal material. The base member 41 is formed of a metal material high in optical reflectance such as aluminum or silver. The first surface 41a of the base member 41 reflects the light proceeding inside the wavelength conversion layer 42. Further, it is possible to further dispose a reflecting layer between the first surface 41a of the base member 41 and the wavelength conversion layer 42.

The heatsink 44 has a plurality of fins. The heatsink 44 is disposed on a second surface 41b of the base member 41. The heatsink 44 is fixed to the base member 41 with, for example, metal bonding. In the wavelength conversion element 40, since the heat of the wavelength conversion layer 42 can be released via the heatsink 44, the heat deterioration of the wavelength conversion layer 42 can be prevented.

The fluorescence YL having a yellow color having been generated by the wavelength conversion element 40 is substantially collimated by the first light collection optical system 26, and then enters the polarization split element 25. As described above, since the polarization split element 25 has a property of transmitting the yellow light component irrespective of the polarization state, the fluorescence YL is transmitted through the polarization split element 25.

Meanwhile, the light BLp as the P-polarized light having been emitted from the polarization split element 25 enters the second wave plate 282. The second wave plate 282 is formed of a ¼ wave plate disposed in the light path of the light BLp between the polarization split element 25 and the diffusely reflecting element 30. The light BLp as the P-polarized light having been emitted from the polarization split element 25 is converted by the second wave plate 282 into, for example, blue light BLc1 as clockwise circularly polarized light, and then enters the second light collection optical system 29.

The second light collection optical system 29 is constituted by a first lens 291 and a second lens 292. The first lens 291 and the second lens 292 are each formed of a convex lens. The second light collection optical system 29 makes the blue light BLc1 enter the diffusely reflecting element 30 in a converged state.

The diffusely reflecting element 30 is disposed on the light path of the light BLp emitted from the polarization split element 25. The blue light BLc1 emitted from the second light collection optical system 29 is diffusely reflected by the diffusely reflecting element 30 toward the polarization split element 25. It is desirable for the diffusely reflecting element 30 to reflect the blue light BLc1 in an angular distribution approximate to the Lambertian diffusion, and at the same time, not to disturb the polarization state of the blue light BLc1.

The light diffusely reflected by the diffusely reflecting element 30 is hereinafter referred to as blue light BLc2. In the present embodiment, by diffusely reflecting the blue light BLc1, there can be obtained the blue light BLc2 having a substantially homogenous illuminance distribution. For example, the blue light BLc1 as the clockwise circularly polarized light is diffusely reflected by the diffusely reflecting element 30 to thereby be converted into the blue light BLc2 as the counterclockwise circularly polarized light.

The blue light beams BLc2 are converted by the second light collection optical system 29 into a roughly parallel pencil, and then enter the second wave plate 282 once again. The blue light BLc2 as the counterclockwise circularly polarized light is converted by the second wave plate 282 into blue light BLs1 as S-polarized light. The blue light BLs1 as the S-polarized light is reflected by the polarization split element 25 toward the integrator optical system 31.

In such a manner, the blue light BLs1 is combined with the fluorescence YL having been transmitted through the polarization split element 25, and is used as the illumination light WL. Specifically, the blue light BLs1 and the fluorescence YL are emitted from the polarization split element 25 toward the respective directions the same as each other, and thus, there is generated the illumination light WL having a white color obtained by combining the blue light BLs1 and the fluorescence YL having a yellow color with each other.

The illumination light WL is emitted toward the integrator optical system 31. The integrator optical system 31 is constituted by a first lens array 31a and a second lens array 31b. The first lens array 31a and the second lens array 31b each have a configuration in which a plurality of lenses is arranged in an array.

The illumination light WL having been transmitted through the integrator optical system 31 enters the polarization conversion element 32. The polarization conversion element 32 has a polarization split film and a wave plate not shown. The polarization conversion element 32 converts the illumination light WL including the fluorescence YL as unpolarized light into linearly polarized light which is made to enter the light modulation device 4R, the light modulation device 4G, and the light modulation device 4B. Specifically, the polarization conversion element 32 converts the illumination light WL into linearly polarized light having a polarization direction corresponding to a transmission axis of the incident side polarization plate of each of the light modulation device 4R, the light modulation device 4G, and the light modulation device 4B.

The illumination light WL having been transmitted through the polarization conversion element 32 enters the superimposing lens 33a. The superimposing lens 33a homogenizes the illuminance distribution of the illumination light WL in the image formation area of each of the light modulation device 4R, the light modulation device 4G, and the light modulation device 4B in cooperation with the integrator optical system 31. The illumination device 2 generates the illumination light WL in such a manner as described above.

Principle of Embodiment

The principle of the light source device 20 according to the present embodiment will hereinafter be described.

First, a light source device according to a related-art example will be assumed.

Figure 5:
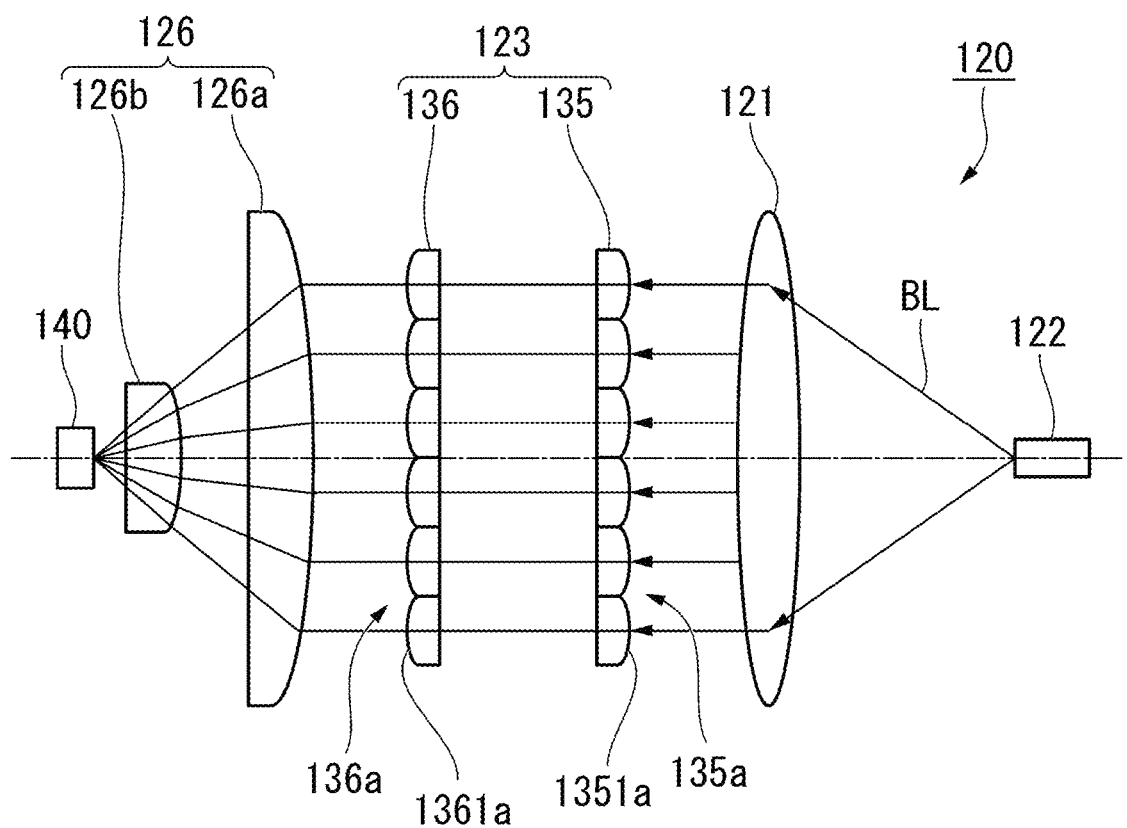
FIG. 5 is a diagram for explaining an action of a microlens array in a related-art example.

FIG. 5 is a schematic diagram for explaining an action of a light source device 120 in the related-art example.

As shown in FIG. 5, the light source device 120 in the related-art example is provided with a light emitting element 122, a collimator lens 121, a micro-lens array 123, a light collection optical system 126, and a wavelength conversion element 140. The micro-lens array 123 has a first lens array 135 and a second lens array 136. The light collection optical system 126 has a first lens 126a and a second lens 126b.

In the light source device 120, the light BL emitted from the light emitting element 122 is collimated by the collimator lens 121. The light BL emitted from the collimator lens 121 is divided by a plurality of first cells 1351a constituting a first multi-lens surface 135a into a plurality of partial light beams, and then, the partial light beams respectively enter second cells 1361a constituting a second multi-lens surface 136a. The plurality of partial light beams emitted from the micro-lens array 123 is collected by the light collection optical system 126, and a surface of the wavelength conversion element 140 is irradiated with the plurality of partial light beams thus collected in a superimposed state.

As described above, the microlens array 123 in the related-art example is designed assuming that parallel light enters the microlens array 123, and one of the partial light beams divided by the first cells 1351a of the first multi-lens surface 135a enters corresponding one of the second cells 1361a of the second multi-lens surface 136a. On this occasion, since each of the first cells 1351a and the wavelength conversion element 140 are in a conjugate relation with each other, the plurality of partial light beams is superimposed by the second lens array 136 and the light collection optical system 126 on the wavelength conversion element 140 to illuminate the entire surface of the wavelength conversion element 140 with a substantially homogenous intensity. However, in this configuration, it is difficult for the heat generated in particular in a central portion of the wavelength conversion element 140 to be released, and thus, there is a problem that the wavelength conversion efficiency decreases with a rise in temperature of the wavelength conversion element 140.

Regarding this problem, in the light source device 20 according to the present embodiment, the problem described above is solved by making the light having the angular distribution enter the microlens array 23 unlike the usage of the microlens array 123 in the related-art example.

It should be noted that in the present specification, the light having the angular distribution is the light including angular components entering a point on the microlens array from a variety of directions. In other words, the light having the angular distribution is nonparallel light. Therefore, when diverging light is emitted from the light emitting element, and no other optical element exists between the light emitting element and the microlens array, the light having the angular distribution enters the microlens array. It should be noted that even when the light enters the microlens array at a predetermined incident angle with the optical axis of the microlens array, when the light is parallel light, the light does not correspond to the light having the angular distribution.

Figure 4:
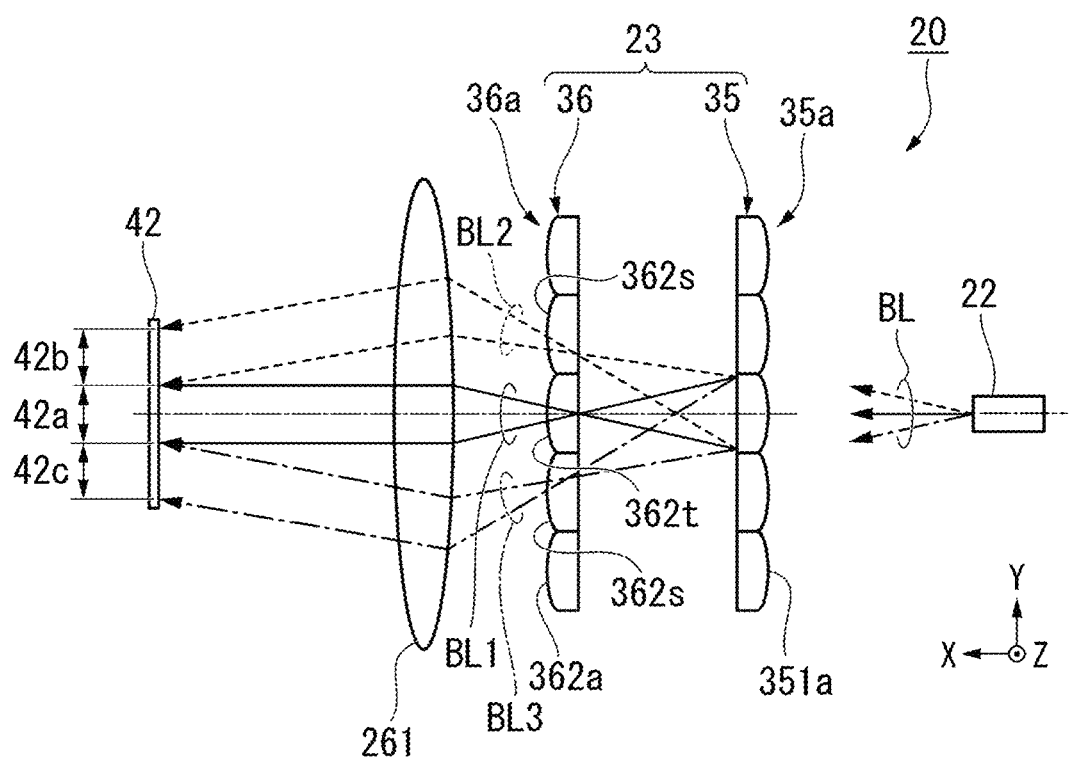
FIG. 4 is a diagram for explaining an action of a microlens array in the first embodiment.

FIG. 4 is a diagram for explaining an action of the microlens array 23 in the present embodiment. It should be noted that in FIG. 4, in order to make the path of the light BL eye-friendly, the light emitting element 22, the microlens array 23, the first lens 261, and the wavelength conversion layer 42 are extracted alone from the light source device 20 shown in FIG. 2, and the light path is shown linearly. In the present example, the first multi-lens surface 35a and the second multi-lens surface 36a are respectively provided with the lens surfaces 351a, 362a arranged in a 5×5 matrix.

As shown in FIG. 4, in the light source device 20 according to the present embodiment, the light BL emitted from the light emitting element 22 enters the first multi-lens surface 35a of the microlens array 23 with the angular distribution. In FIG. 4, there is shown only the light BL which enters one of the first cells 351a located at the center of the first multi-lens surface 35a out of the light BL emitted from the light emitting element 22.

The light BL which proceeds from one of the first cells 351a constituting the first multi-lens surface 35a toward the second multi-lens surface 36a has a first light beam BL1 which enters one of the second cells 362a constituting the second multi-lens surface 36a, a second light beam BL2 which enters different one of the second cells 362a from the second cell 362a which the first light beam BL1 enters, and a third light beam BL3 which enters different one of the second cells 362a from the second cell 362a which the first light beam BL1 and the second light beam BL2 enter.

The first light beam BL1 proceeds from the first cell 351a located at the center of the first multi-lens surface 35a in a direction parallel to the optical axis ax1, and therefore, enters the second cell 362a located at the center of the second multi-lens surface 36a opposed to that first cell 351a. In contrast, the second light beam BL2 proceeds from the first cell 351a located at the center of the first multi-lens surface 35a in a direction tilted toward the +Y side with respect to the optical axis ax1, and therefore, enters the second cell 362a located at a position shifted as much as one cell toward the +Y side from the second cell 362a located at the center of the second multi-lens surface 36a. Further, the third light beam BL3 proceeds from the first cell 351a located at the center of the first multi-lens surface 35a in a direction tilted toward the −Y side with respect to the optical axis ax1, and therefore, enters the second cell 362a located at a position shifted as much as one cell toward the −Y side from the second cell 362a located at the center of the second multi-lens surface 36a. Hereinafter, for the sake of simplification of the description, the second cell 362a corresponding to the first cell 351a which the light BL enters is referred to as an opposed lens surface 362t, and the second cell 362a located at a position shifted from the opposed lens surface 362t is referred to as a peripheral lens surface 362s.

As described above, out of the light entering the first cell 351a, the first light beam BL1 enters the opposed lens surface 362t, and the second light beam BL2 and the third light beam BL3 each enter the peripheral lens surface 362s. As a result, areas different from each other on the wavelength conversion layer 42 as an illumination target are irradiated respectively with the light beams BL1, BL2, and BL3. In other words, a first area 42a of the wavelength conversion layer is irradiated with the first light beam BL1. A second area 42b different from the first area 42a on the wavelength conversion layer 42 is irradiated with the second light beam BL2. A third area 42c different from the first area 42a and the second area 42b on the wavelength conversion layer 42 is irradiated with the third light beam BL3. The first area 42a is a central area of the wavelength conversion layer 42. The second area 42b is a rim area of the wavelength conversion layer 42 adjacent at the +Y side to the first area 42a. The third area 42c is a rim area of the wavelength conversion layer 42 adjacent at the −Y side to the first area 42a.

It should be noted that although FIG. 4 shows a state viewed from the Z-axis direction, when viewed from the Y-axis direction, there occurs substantially the same action as shown in FIG. 4. Specifically, one of the light beams included in the light entering through the first cell 351a located at the center of the first multi-lens surface 35a enters the opposed lens surface 362t of the second multi-lens surface 36a. In contrast, another of the light beams enters the peripheral lens surface 362s located at a position shifted toward the +Z side from the opposed lens surface 362t in the second multi-lens surface 36a. Still another of the light beams enters the peripheral lens surface 362s located at a position shifted toward the −Z side from the opposed lens surface 362t.

Further, substantially the same action as shown in FIG. 4 also occurs in an oblique direction tilted from the Y-axis direction and the Z-axis direction in the Y-Z plane viewed from the direction of the optical axis ax1. Therefore, the light BL which enters one of the first cells 351a enters the 9 second cells 362a which include one of the opposed lens surfaces 362t and the 8 peripheral lens surfaces 362s, and are arranged in a 3×3 matrix. As a result, 9 divisional areas arranged in a 3×3 matrix on the wavelength conversion layer 42 are respectively irradiated with the 9 light beams which enter the 9 second cells 362a different from each other.

Further, attention is focused only on the light BL which enters one of the first cells 351a located at the center of the first multi-lens surface 35a in the above description, but in reality, substantially the same action as in the light BL which enters the first cell 351a at the center occurs also in the light BL which enters another of the first cells 351a on the first multi-lens surface 35a. Specifically, with respect to all of the first cells 351a which the light BL enters, the light BL which enters through one of the first cells 351a enters the 9 second cells 362a including the opposed lens surface 362t and the peripheral lens surfaces 362s, and the 9 divisional areas on the wavelength conversion layer 42 are respectively irradiated with the 9 light beams which enter the respective second cells 362a. Therefore, each of the 9 light beams which enter the first cells 351a to be divided illuminates each of the divisional areas on the wavelength conversion layer 42 in a state of being superimposed as much as the number of the first cells 351a.

Advantages of First Embodiment

For example, when dividing the incident light with the first multi-lens surface into the plurality of partial light beams, and then making all of the partial light beams superimpose on a single place on the wavelength conversion element with the second multi-lens surface as in Document 1 described above, it is possible to illuminate the entire area of the wavelength conversion element with a substantially homogenous illuminance. However, in this case, since the temperature of the wavelength conversion element rises evenly in the entire area, the heat in the central portion of the wavelength conversion element is particularly difficult to be released, and there is a problem that the wavelength conversion efficiency decreases with the rise in temperature of the phosphor.

To cope with this problem, the light source device 20 according to the present embodiment is provided with the light emitting element 22 for emitting the light BL, and the microlens array 23 having the first multi-lens surface 35a which the light emitted from the light emitting element 22 enters, and the second multi-lens surface 36a for emitting the light BL which enters through the first multi-lens surface 35a, the light BL enters the first multi-lens surface 35a with the angular distribution, the first multi-lens surface 35a has the plurality of first cells 351a arranged in an array, the second multi-lens surface 36a has the plurality of second cells 362a arranged in an array, the light which proceeds from one of the first cells 351a toward the second multi-lens surface 36a has the first light beam BL1 which enters one of the second cells 362a, the second light beam BL2 which enters different one of the second cells 362a from the second cell 362a which the first light beam BL1 enters, and the third light beam BL3 which enters different one of the second cells 362a from the second cell 362a which the first light beam BL1 and the second light beam BL2 enter, the first area of the illumination target is irradiated with the first light beam BL1, the second area different from the first area of the illumination target is irradiated with the second light beam BL2, and the third area different from the first area and the second area of the illumination target is irradiated with the third light beam BL3.

In the light source device 20 according to the present embodiment, since the light BL enters the first multi-lens surface 35a with the angular distribution as described above, the light BL having entered one of the first cells 351a enters the plurality of second cells 362a different from each other to illuminate the illumination target in the state of being divided into a plurality of areas different from each other. Further, since the light beams emitted from the plurality of second cells 362a are superimposed on each of the areas, it is possible to homogenize the illuminance distribution of the illumination target. Therefore, it is possible for the light source device 20 according to the present embodiment to illuminate the plurality of areas obtained by dividing the illumination target with low illuminance unevenness.

Further, in the present embodiment, the light emitted by the light emitting element 22 is the excitation light, the excitation light enters the microlens array 23, and the light source device 20 is further provided with the wavelength conversion element 40 which the excitation light emitted from the microlens array 23 enters, and which performs the wavelength conversion on the excitation light to emit the fluorescence YL.

According to this configuration, since the superimposition illumination is performed on every area obtained by dividing the wavelength conversion element 40, it is easy for the heat generated in the wavelength conversion element 40 to be released compared to when the superimposition illumination is performed on the entire area of the wavelength conversion element 40, and it is possible to efficiently suppress the rise in temperature of the wavelength conversion element 40. Thus, it is possible to suppress the decrease in wavelength conversion efficiency due to the rise in temperature of the wavelength conversion element 40.

The description is hereinabove presented focusing attention on when the illumination target is the wavelength conversion element 40, but in the case of the present embodiment, substantially the same advantages can be obtained with respect to the diffusely reflecting element 30 as another illumination target. Specifically, the light BL illuminates the diffusely reflecting element 30 in the state of being divided into 9 areas different from each other. Thus, since it is possible to effectively suppress the rise in temperature of the diffusely reflecting element 30, it is possible to increase the reliability of the diffusely reflecting element 30.

Further, in the light source device 20 according to the present embodiment, the light emitting element 22 emits the light BL having the angular distribution.

According to this configuration, since there is no need to dispose an optical element for generating the angular distribution on the light path of the light BL between the light emitting element 22 and the microlens array 23, it is possible to simplify the configuration of the light source device 20.

Further, the projector 1 according to the present embodiment is provided with the light source device 20, the light modulation devices 4B, 4G, and 4R for modulating the illumination light WL emitted from the light source device 20 in accordance with image information, and the projection optical device 6 for projecting the light modulated by the light modulation devices 4B, 4G, and 4R.

The projector 1 according to the present embodiment is equipped with the light source device 20 having the advantages described above, and is therefore small in size and excellent in display quality.

FIRST MODIFIED EXAMPLE

An illumination device according to a first modified example will hereinafter be described.

Figure 6:
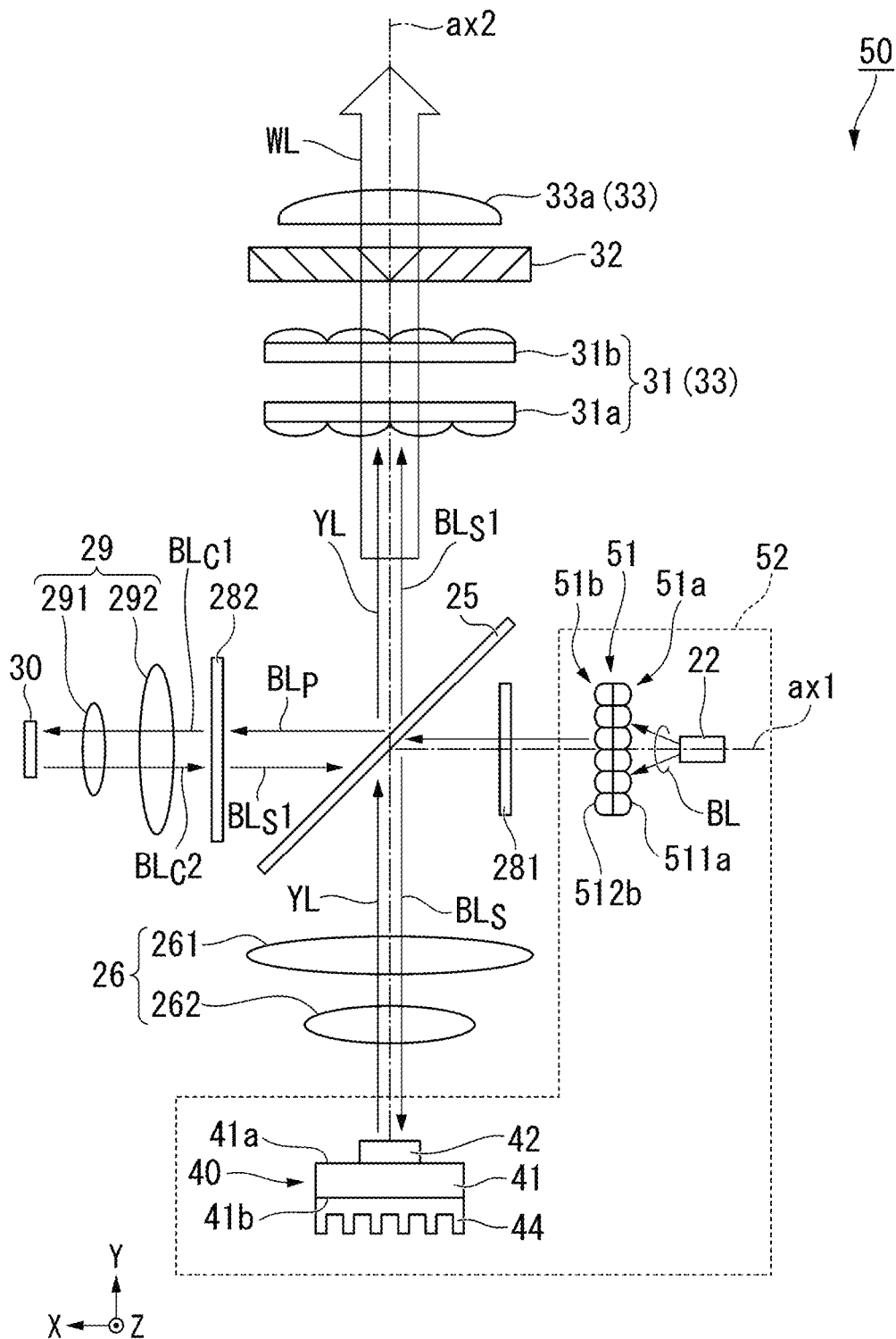
FIG. 6 is a schematic configuration diagram of an illumination device according to a first modified example.

FIG. 6 is a schematic configuration diagram of the illumination device 50 according to the first modified example.

In FIG. 6, the constituents common to the illumination device 2 according to the first embodiment shown in FIG. 2 are denoted by the same reference symbols, and the description thereof will be omitted.

As shown in FIG. 6, in the light source device 52 in the present modified example, a microlens array 51 is formed of a double-sided microlens array having multi-lens surfaces formed on both surfaces of a single base member. Specifically, the microlens array 51 has a first multi-lens surface 51a which the light BL emitted from the light emitting element 22 enters, and a second multi-lens surface 51b for emitting the light BL which enters through the first multi-lens surface 51a. The first multi-lens surface 51a has a plurality of first cells 511a arranged in an array. The second multi-lens surface 51b has a plurality of second cells 512b arranged in an array.

Advantages of First Modified Example

Also in the light source device 52 according to the present modified example, there are obtained substantially the same advantages as those of the first embodiment such as the advantage that it is possible to illuminate the plurality of areas on the wavelength conversion element 40 with low illuminance unevenness, and the advantage that it is possible to suppress the decrease in wavelength conversion efficiency.

Further, in the present modified example, since the microlens array 51 is formed of the double-sided microlens array, it is possible to achieve further reduction in size of the light source device 52.

Second Embodiment

A second embodiment of the present disclosure will hereinafter be described using FIG. 7.

The second embodiment is substantially the same in basic configurations of a projector and an illumination device as the first embodiment, and is different in configuration of a light source device from the first embodiment. Therefore, the description related to the overall configurations of the projector and the illumination device will be omitted.

Figure 7:
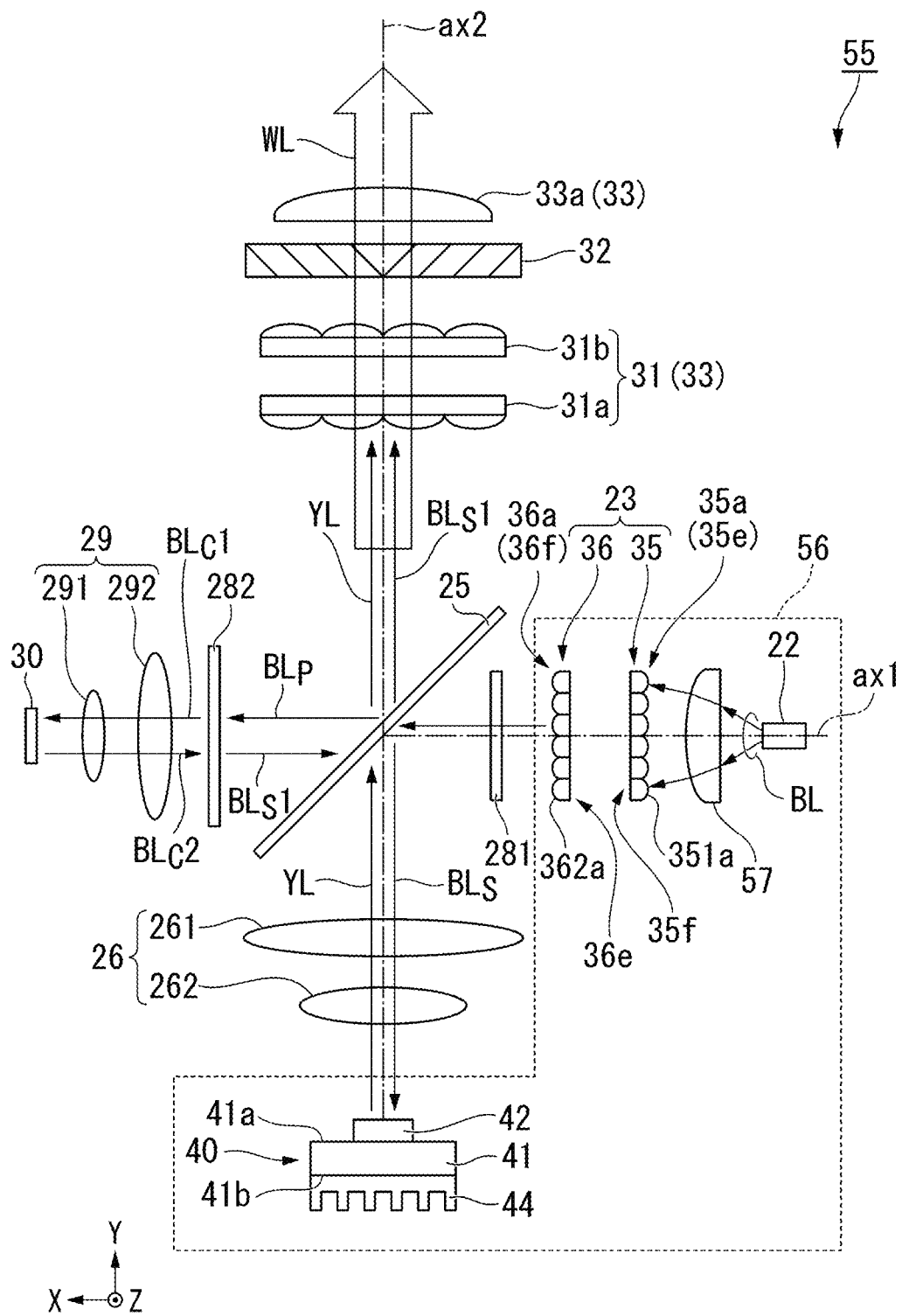
FIG. 7 is a schematic configuration diagram of an illumination device according to a second embodiment.

FIG. 7 is a schematic configuration diagram of the illumination device 55 according to the present embodiment.

In FIG. 7, the constituents common to FIG. 2 used in the description of the first embodiment are denoted by the same reference symbols, and the detailed description thereof will be omitted.

As shown in FIG. 7, the illumination device 55 according to the present embodiment is provided with a light source device 56, the first wave plate 281, the polarization split element 25, the first light collection optical system 26, the second wave plate 282, the second light collection optical system 29, the diffusely reflecting element 30, the integrator optical system 31, the polarization conversion element 32, and the superimposing lens 33a.

The light source device 56 according to the present embodiment is provided with the light emitting element 22, a first optical system 57, the microlens array 23, and the wavelength conversion element 40.

The first optical system 57 is disposed on the light path of the light BL between the light emitting element 22 and the microlens array 23. The first optical system 57 is formed of a convex lens having positive power. It should be noted that the first optical system 57 can be formed of a plurality of lenses. The first optical system 57 converts the light BL emitted from the light emitting element 22 into the light having the angular distribution.

In the case of the present embodiment, since the light BL having the angular distribution is emitted from the light emitting element 22, the first optical system 57 changes the angular distribution of the light BL emitted from the light emitting element 22 and then emits the result. Specifically, since the first optical system 57 has the positive power, the angular distribution of the light BL after emitted from the first optical system 57 becomes smaller than the angular distribution of the light BL before entering the first optical system 57. Therefore, the light BL emitted from the first optical system 57 enters the first multi-lens surface 35a of the microlens array 23 with the angular distribution.

The rest of the configuration of the illumination device 55 is substantially the same as that of the illumination device 2 according to the first embodiment.

Advantages of Second Embodiment

Also in the light source device 56 according to the present embodiment, there are obtained substantially the same advantages as those of the first embodiment such as the advantage that it is possible to illuminate the plurality of areas on the wavelength conversion element 40 with low illuminance unevenness, and the advantage that it is possible to suppress the decrease in wavelength conversion efficiency.

Further, the light source device 56 according to the present embodiment is further provided with the first optical system 57 which is disposed on the optical path of the light BL between the light emitting element 22 and the microlens array 23, has the positive power, and converts the incident light BL into the light BL having the angular distribution.

In the case of the first embodiment, since the angular distribution of the light BL entering the first multi-lens surface 35a is fixed in accordance with the light emitting element 22, the angular distribution of the light BL which enters the first multi-lens surface 35a is constant unless the light emitting element 22 is changed. In contrast, in the case of the present embodiment, since the first optical system 57 is disposed on the light path between the light emitting element 22 and the microlens array 23, it is possible to adjust the angular distribution of the light BL which enters the first multi-lens surface 35a by changing the curvature of the convex lens constituting the first optical system 57.

For example, the higher the curvature of the convex lens constituting the first optical system 57 is made, the larger the angle at which the ray in the vicinity of the principal ray of the light BL is refracted becomes, and therefore, the more the proportion of the light BL entering the peripheral lens surfaces 362s to the light BL entering the opposed lens surface 362t increases. As a result, it is possible to make the intensity in the rim area of the wavelength conversion layer 42 relatively higher to the intensity of the central area of the wavelength conversion layer 42. Since it is possible to change the ratio of the light BL divided into the opposed lens surface 362t of the second multi-lens surface 36a and the peripheral lens surfaces 362s as described above, it is possible to adjust the intensity distribution of the light BL with which the plurality of areas on the wavelength conversion layer 42 is irradiated.

Third Embodiment

A third embodiment of the present disclosure will hereinafter be described using FIG. 8.

The third embodiment is substantially the same in basic configurations of a projector and an illumination device as the first embodiment, and is different in configuration of a light source device from the first embodiment. Therefore, the description related to the overall configurations of the projector and the illumination device will be omitted.

Figure 8:
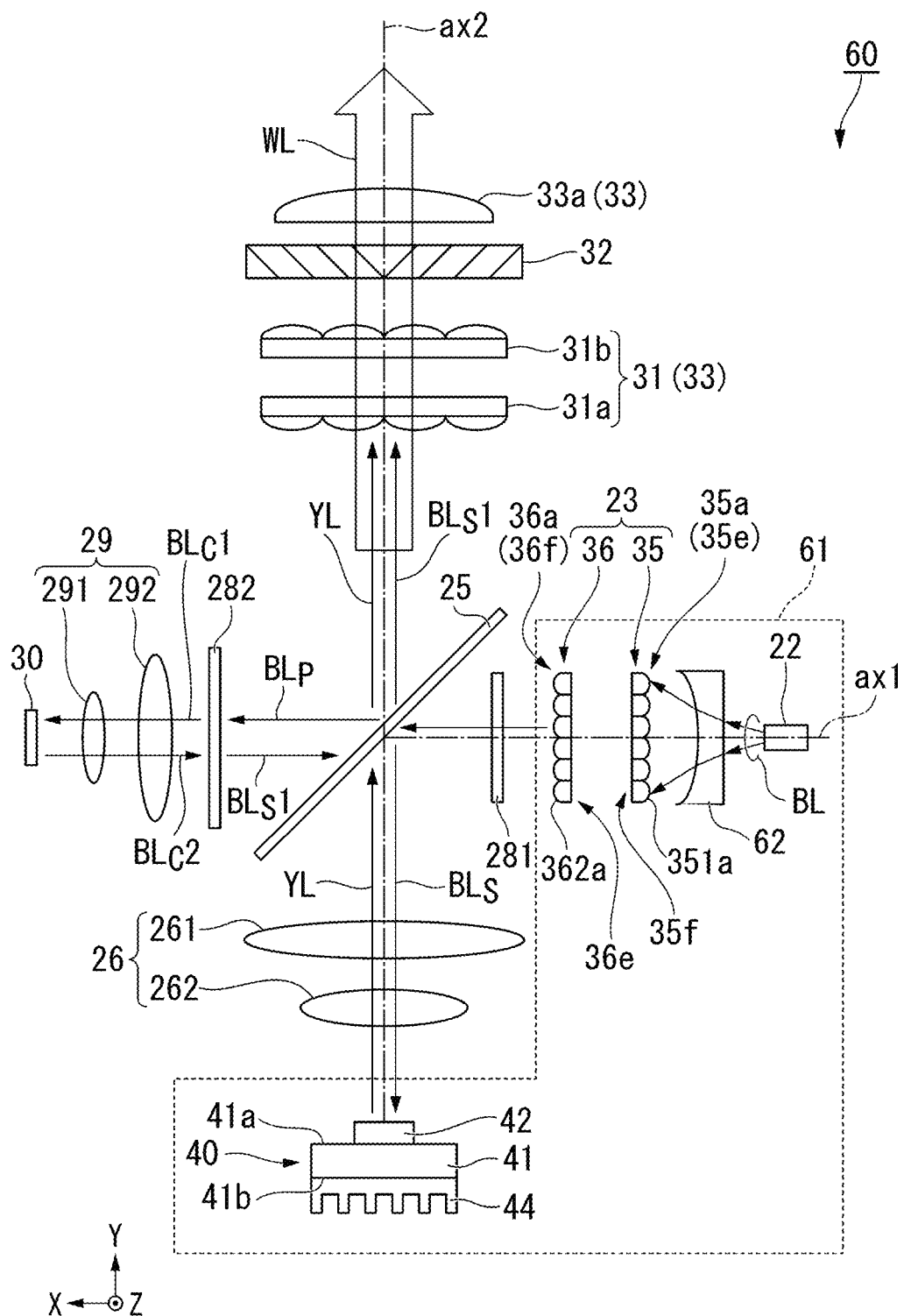
FIG. 8 is a schematic configuration diagram of an illumination device according to a third embodiment.

FIG. 8 is a schematic configuration diagram of the illumination device 60 according to the present embodiment.

In FIG. 8, the constituents common to FIG. 2 used in the description of the first embodiment are denoted by the same reference symbols, and the detailed description thereof will be omitted.

As shown in FIG. 8, the illumination device 60 according to the present embodiment is provided with a light source device 61, the first wave plate 281, the polarization split element 25, the first light collection optical system 26, the second wave plate 282, the second light collection optical system 29, the diffusely reflecting element 30, the integrator optical system 31, the polarization conversion element 32, and the superimposing lens 33a.

The light source device 61 according to the present embodiment is provided with the light emitting element 22, a first optical system 62, the microlens array 23, and the wavelength conversion element 40.

The first optical system 62 is disposed on the light path of the light BL between the light emitting element 22 and the microlens array 23. The first optical system 62 is formed of a concave lens having negative power. It should be noted that the first optical system 62 can be formed of a plurality of lenses. The first optical system 62 converts the light BL emitted from the light emitting element 22 into the light BL having the angular distribution.

In the case of the present embodiment, since the light BL having the angular distribution is emitted from the light emitting element 22, the first optical system 62 changes the angular distribution of the light BL emitted from the light emitting element 22 and then emits the result. Specifically, since the first optical system 62 has the negative power, the angular distribution of the light BL after emitted from the first optical system 62 becomes larger than the angular distribution of the light BL before entering the first optical system 62. Therefore, the light BL emitted from the first optical system 62 enters the first multi-lens surface 35a of the microlens array 23 with the angular distribution.

The rest of the configuration of the illumination device 60 is substantially the same as that of the illumination device 2 according to the first embodiment.

Advantages of Third Embodiment

Also in the light source device 61 according to the present embodiment, there are obtained substantially the same advantages as those of the first embodiment such as the advantage that it is possible to illuminate the plurality of areas on the wavelength conversion element 40 with low illuminance unevenness, and the advantage that it is possible to suppress the decrease in wavelength conversion efficiency.

Further, the light source device 61 according to the present embodiment is further provided with the first optical system 62 which is disposed on the optical path of the light BL between the light emitting element 22 and the microlens array 23, has the negative power, and converts the incident light BL into the light BL having the angular distribution.

Also in the case of the present embodiment, similarly to the second embodiment, since the first optical system 62 is disposed on the light path between the light emitting element 22 and the microlens array 23, it is possible to adjust the angular distribution of the light BL which enters the first multi-lens surface 35a by changing the curvature of the concave lens constituting the first optical system 62. Thus, since it is possible to change the ratio of the light BL divided into the opposed lens surface 362t of the second multi-lens surface 36a and the peripheral lens surfaces 362s, it is possible to adjust the intensity distribution of the light with which the plurality of areas on the wavelength conversion layer 42 is irradiated.

Fourth Embodiment

A fourth embodiment of the present disclosure will hereinafter be described using FIG. 9.

The fourth embodiment is substantially the same in basic configurations of a projector and an illumination device as the first embodiment, and is different in configuration of a light source device from the first embodiment. Therefore, the description related to the overall configurations of the projector and the illumination device will be omitted.

Figure 9:
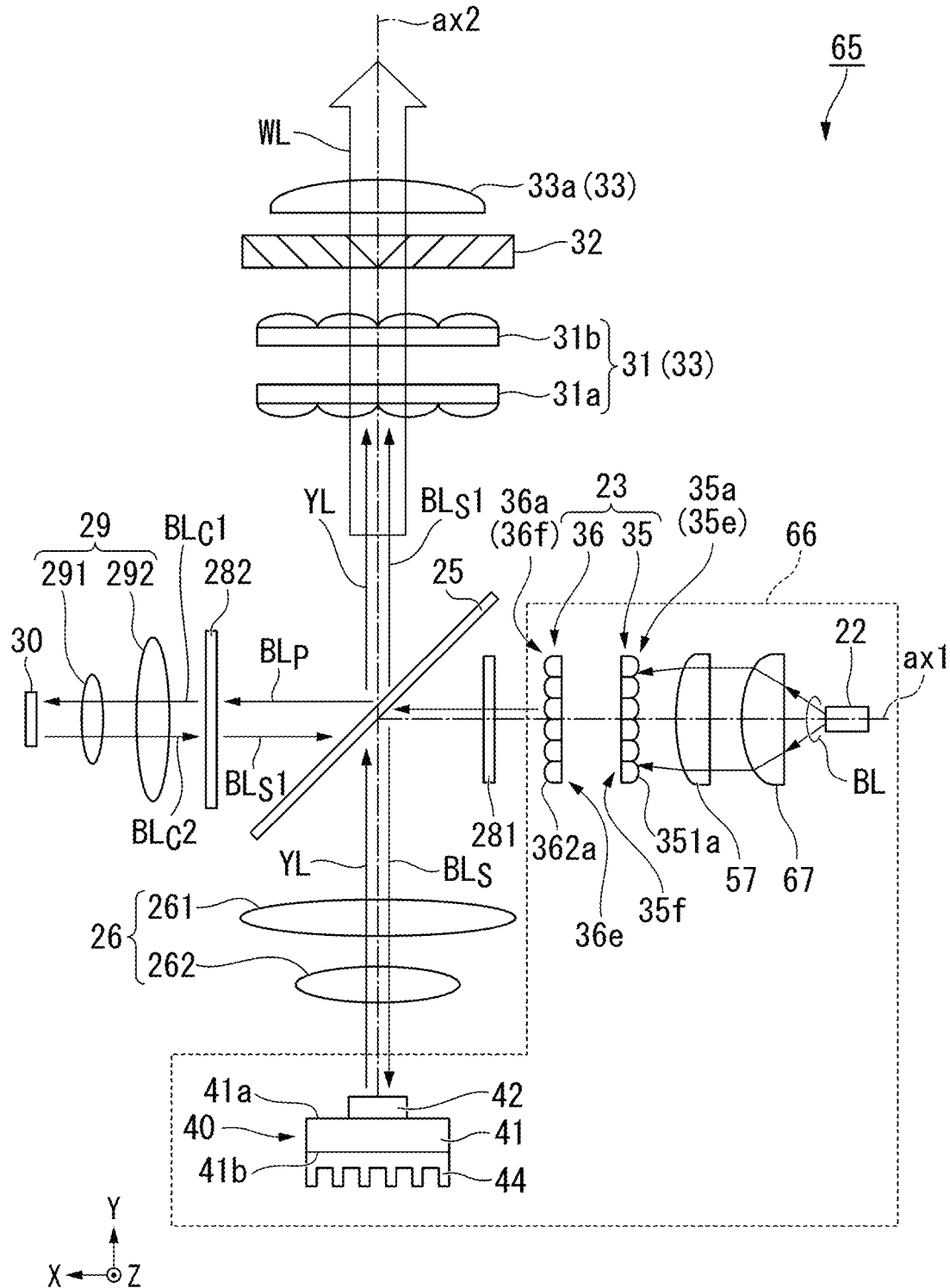
FIG. 9 is a schematic configuration diagram of an illumination device according to a fourth embodiment.

FIG. 9 is a schematic configuration diagram of the illumination device 65 according to the present embodiment.

In FIG. 9, the constituents common to FIG. 2 used in the description of the first embodiment are denoted by the same reference symbols, and the detailed description thereof will be omitted.

As shown in FIG. 9, the illumination device 65 according to the present embodiment is provided with a light source device 66, the first wave plate 281, the polarization split element 25, the first light collection optical system 26, the second wave plate 282, the second light collection optical system 29, the diffusely reflecting element 30, the integrator optical system 31, the polarization conversion element 32, and the superimposing lens 33a.

The light source device 66 according to the present embodiment is provided with the light emitting element 22, a second optical system 67, the first optical system 57, the microlens array 23, and the wavelength conversion element 40.

The second optical system 67 is disposed on the light path of the light BL between the light emitting element 22 and the first optical system 57. The first optical system 57 is formed of a convex lens having the positive power. The second optical system 67 converts the light BL emitted from the light emitting element 22 into parallel light. In other words, the second optical system 67 is formed of a collimator lens. It should be noted that the second optical system 67 can be formed of a plurality of lenses.

The first optical system 57 is disposed on the light path of the light BL between the second optical system 67 and the microlens array 23. The first optical system 57 is formed of a convex lens having the positive power. The first optical system 57 converts the parallel light emitted from the second optical system 67 into the light having an angular distribution. In the case of the present embodiment, since the first optical system 57 has the positive power, the parallel light having entered the first optical system 57 is converted into converging light. Therefore, the light BL emitted from the first optical system 57 enters the first multi-lens surface 35a of the microlens array 23 with the angular distribution.

The rest of the configuration of the illumination device 65 is substantially the same as that of the illumination device 2 according to the first embodiment.

Advantages of Fourth Embodiment

Also in the light source device 66 according to the present embodiment, there are obtained substantially the same advantages as those of the first embodiment such as the advantage that it is possible to illuminate the plurality of areas on the wavelength conversion element 40 with low illuminance unevenness, and the advantage that it is possible to suppress the decrease in wavelength conversion efficiency.

Further, the light source device 66 according to the present embodiment is further provided with the first optical system 57 which is disposed on the optical path of the light BL between the light emitting element 22 and the microlens array 23, has the positive power, and converts the incident light BL into the light BL having the angular distribution.

According to this configuration, it is possible to adjust the angular distribution of the light BL which enters the first multi-lens surface 35a by changing the curvature of the convex lens constituting the first optical system 57. Thus, it is possible to obtain substantially the same advantage as that of the second embodiment such as the advantage that it is possible to adjust the intensity distribution of the light with which the plurality of areas on the wavelength conversion layer 42 is irradiated.

Further, the light source device 66 according to the present embodiment is further provided with the second optical system 67 which is disposed on the light path of the light BL between the light emitting element 22 and the first optical system 57 to convert the light BL into the parallel light.

According to this configuration, since the light BL collimated by the second optical system 67 enters the first optical system 57, it is possible to increase a degree of freedom in adjusting the angular distribution using the curvature of the convex lens constituting the first optical system 57.

Here, the inventors have conducted a simulation on how the illuminance of the light with which the plurality of areas on the illumination target is irradiated changes in accordance with the curvature of the convex lens constituting the first optical system 57.

Figure 10:
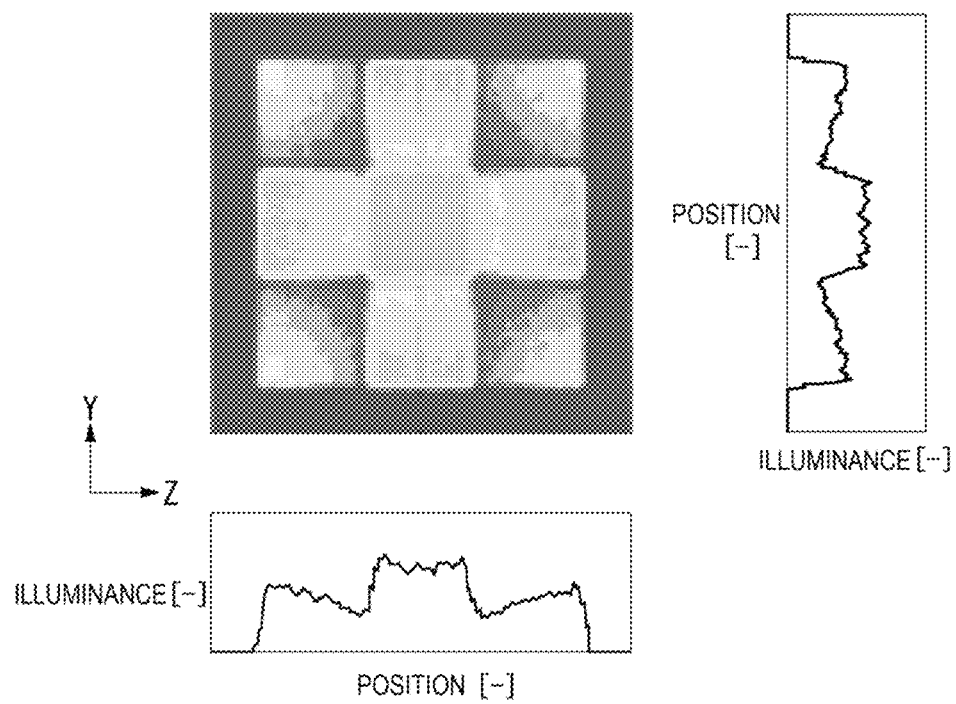
FIG. 10 is a diagram showing an illuminance distribution on an illumination target by a light source device according to the fourth embodiment.
Figure 11:
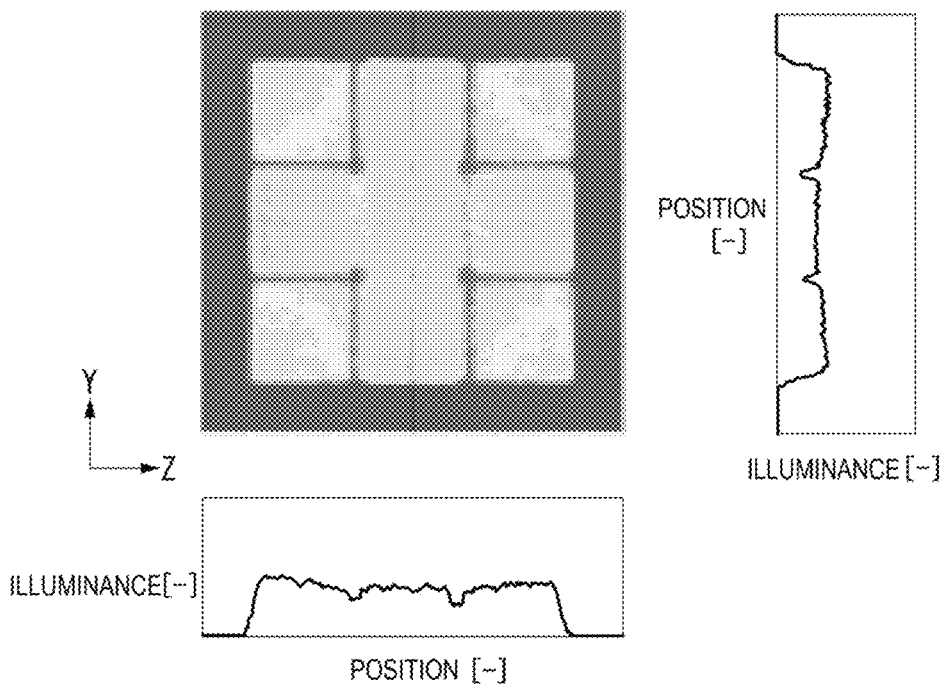
FIG. 11 is a diagram showing an illuminance distribution on the illumination target when varying a curvature of a first optical system.
Figure 12:
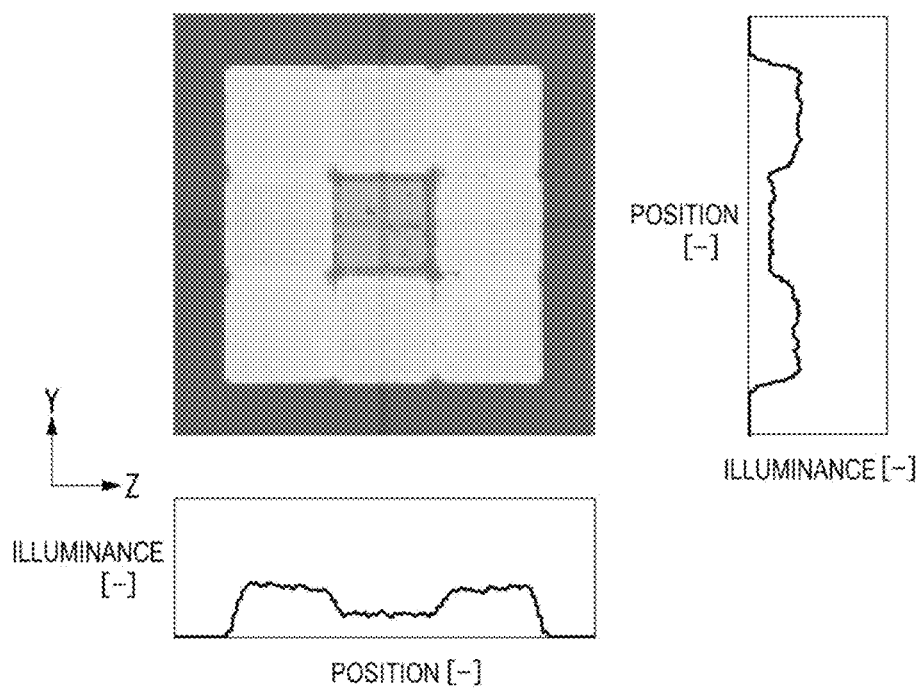
FIG. 12 is a diagram showing an illuminance distribution on the illumination target when further varying the curvature of the first optical system.

FIG. 10, FIG. 11, and FIG. 12 are diagrams showing the result of the simulation conducted by the inventors. In each of the drawings, an upper-left diagram shows an illuminance distribution on the illumination target, and a lower-left diagram and an upper-right diagram are graphs representing the illuminance distributions along the Y-axis direction and the Z-axis direction, respectively, assuming the incident direction of the light to the illumination target as the X-axis direction.

First, there is assumed a first simulation condition in which the curvature of the convex lens constituting the first optical system 57 is sufficiently low in the configuration in which the light BL collimated by the second optical system 67 enters the first optical system 57. In this condition, the angular distribution of the light BL entering the first multi-lens surface 35a is small, and the light BL entering the first multi-lens surface 35a approximates the parallel light. In this case, the proportion of an amount of the light entering the peripheral lens surfaces 362s to an amount of the light entering the opposed lens surface 362t is sufficiently low. Therefore, as shown in FIG. 10, the illuminance in the central area becomes higher than the illuminance in the rim area in the plurality of areas arranged in the 3×3 matrix on the illumination target.

Then, as a second simulation condition, the curvature of the convex lens constituting the first optical system 57 is made higher than in the first simulation condition. In this case, the proportion of the amount of the light entering the peripheral lens surfaces 362s to the amount of the light entering the opposed lens surface 362t becomes higher than in the first simulation condition. As a result, the illuminance in the central area and the illuminance in the rim area becomes substantially equivalent to each other in the plurality of areas arranged in the 3×3 matrix on the illumination target as shown in FIG. 11.

Then, as a third simulation condition, the curvature of the convex lens constituting the first optical system is made higher than in the second simulation condition. In this case, the proportion of the amount of the light entering the peripheral lens surfaces 362s to the amount of the light entering the opposed lens surface 362t becomes higher. As a result, as shown in FIG. 12, the illuminance in the central area becomes lower than the illuminance in the rim area in the plurality of areas arranged in the 3×3 matrix on the illumination target in an opposite manner to the result shown in FIG. 10.

In other words, assuming that the first area described in the first embodiment is the central area of the wavelength conversion element 40, and the second area is the rim area of the wavelength conversion element 40, the illuminance of the first light beam BL1 in the first area is lower than the illuminance of the second light beam BL2 in the second area in the third simulation condition. As described above, when the illumination target is the wavelength conversion element 40, by making the illuminance of the light in the central area lower than the illuminance of the light in the rim area, it is possible to suppress the rise in temperature in the central area of the wavelength conversion element 40, and thus, it is possible to efficiently cool the wavelength conversion element 40. Thus, it is possible to improve the wavelength conversion efficiency.

It has been found out that it is possible to adjust the illuminance distribution of the light with which the plurality of areas on the illumination target is irradiated by changing the curvature of the convex lens constituting the first optical system 57 as described above.

Fifth Embodiment

A fifth embodiment of the present disclosure will hereinafter be described using FIG. 13.

The fifth embodiment is substantially the same in basic configurations of a projector and an illumination device as the first embodiment, and is different in configuration of a light source device from the first embodiment. Therefore, the description related to the overall configurations of the projector and the illumination device will be omitted.

Figure 13:
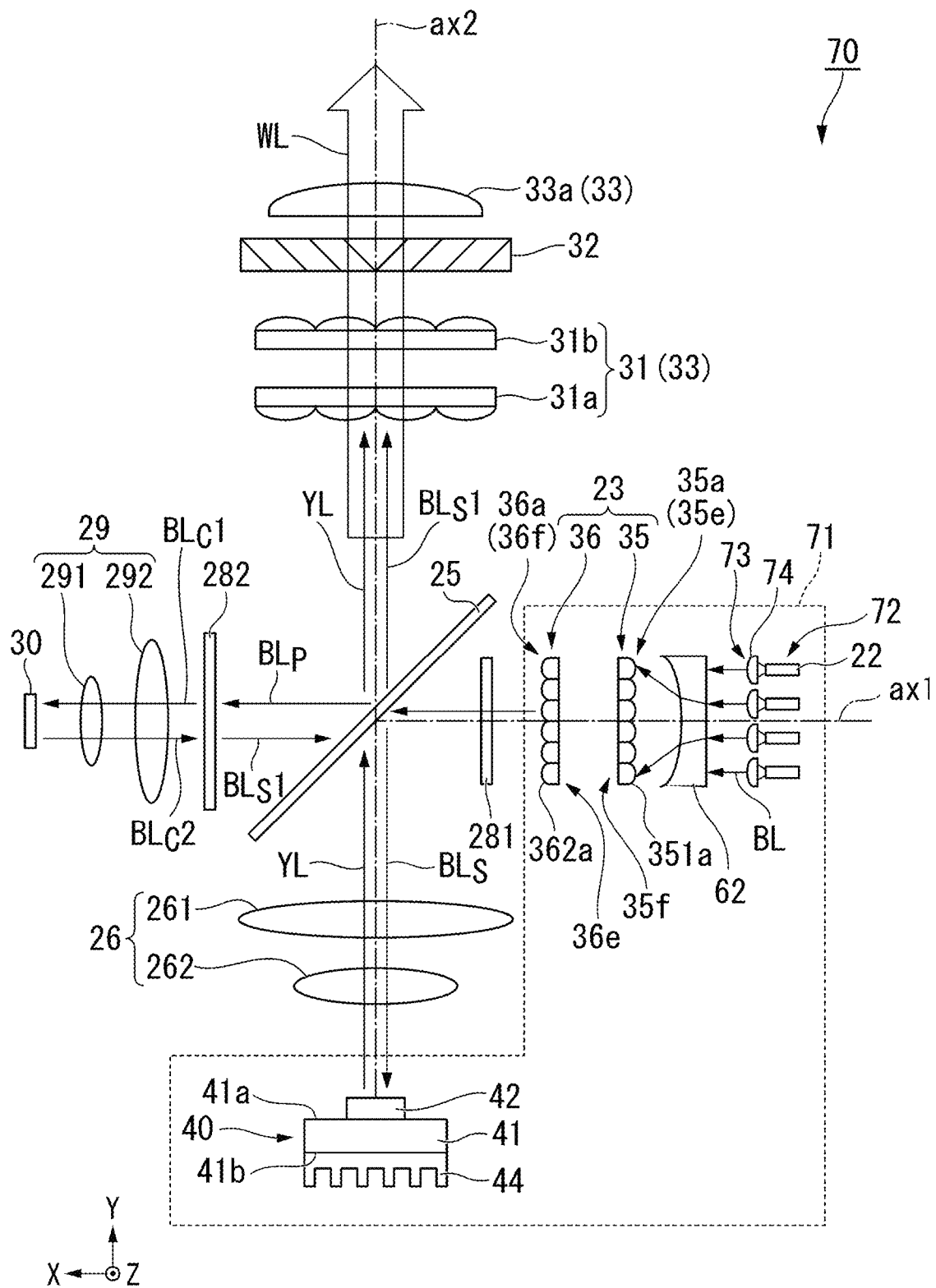
FIG. 13 is a schematic configuration diagram of an illumination device according to a fifth embodiment.

FIG. 13 is a schematic configuration diagram of the illumination device 70 according to the present embodiment.

In FIG. 13, the constituents common to FIG. 2 used in the description of the first embodiment are denoted by the same reference symbols, and the detailed description thereof will be omitted.

As shown in FIG. 13, the illumination device 70 according to the present embodiment is provided with a light source device 71, the first wave plate 281, the polarization split element 25, the first light collection optical system 26, the second wave plate 282, the second light collection optical system 29, the diffusely reflecting element 30, the integrator optical system 31, the polarization conversion element 32, and the superimposing lens 33a.

The light source device 71 according to the present embodiment is provided with a light emitting device 72, a second optical system 73, a first optical system 62, the microlens array 23, and the wavelength conversion element 40.

The light emitting device 72 has a plurality of light emitting elements 22. Each of the light emitting elements 22 emits the light BL along the X-axis direction. The number and the arrangement of the light emitting elements 22 are not particularly limited. The plurality of light emitting elements 22 can be arranged in, for example, an array, or can also be arranged in a row.

The second optical system 73 has a plurality of collimator lenses 74. The number of the collimator lenses 74 is the same as the number of the light emitting elements 22. In other words, the light BL emitted from one of the light emitting elements 22 enters one of the collimator lenses 74 disposed so as to be opposed to that light emitting element 22. The light BL emitted from that light emitting element 22 is collimated by one of the collimator lenses 74, and is emitted toward the first optical system 62. A plurality of beams of the light BL emitted from the second optical system 73 enters the first optical system 62.

The rest of the configuration of the illumination device 70 is substantially the same as that of the illumination device 60 according to the third embodiment shown in FIG. 8.

Advantages of Fifth Embodiment

Also in the light source device 71 according to the present embodiment, there are obtained substantially the same advantages as those of the first embodiment such as the advantage that it is possible to illuminate the plurality of areas on the wavelength conversion element 40 with low illuminance unevenness, and the advantage that it is possible to suppress the decrease in wavelength conversion efficiency.

Further, the light source device 71 according to the present embodiment is further provided with the first optical system 62 which is disposed on the optical path of the light BL between the light emitting device 72 and the microlens array 23, has the negative power, and converts the incident light into the light BL having the angular distribution.

According to this configuration, it is possible to adjust the angular distribution of the light BL which enters the first multi-lens surface 35a by changing the curvature of the concave lens constituting the first optical system 62. Thus, it is possible to obtain substantially the same advantage as that of the second embodiment such as the advantage that it is possible to adjust the intensity distribution of the light BL with which the plurality of areas on the wavelength conversion layer 42 is irradiated.

It should be noted that the first optical system in the present embodiment can be formed of a convex lens.

Here, there is assumed a light source device according to a comparative example which is not provided with the second optical system for collimating the light emitted from the light emitting device.

Figure 14:
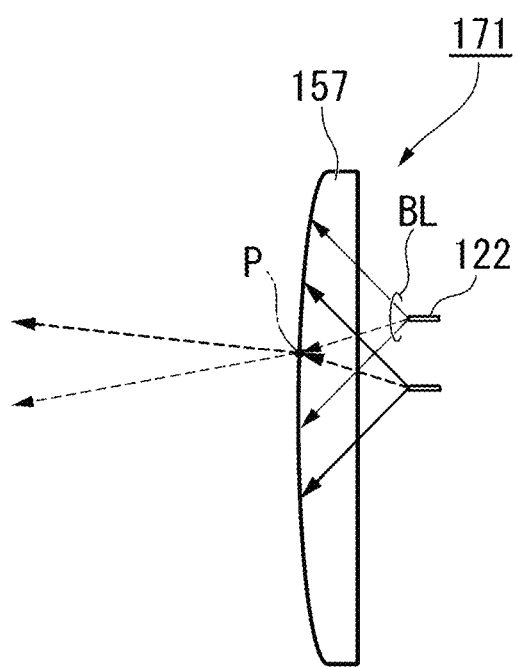
FIG. 14 is a diagram for explaining a problem of a light source device according to a comparative example.

FIG. 14 is a diagram for explaining a problem of the light source device 171 according to the comparative example. In the light source device 171 according to the comparative example, the first optical system 157 is formed of a convex lens.

As shown in FIG. 14, in the light source device 171 according to the comparative example, the light BL emitted from each of the light emitting elements 122 is not collimated, but enters the first optical system 157 with the angular distribution. When the light source device 171 has the plurality of light emitting elements 122, the plurality of beams of the light BL emitted from the plurality of light emitting elements 122 different from each other enters a predetermined place P on the lens surface of the first optical system 157 from respective directions different from each other. Therefore, in the light source device 171 according to the comparative example, there is a problem that there is a possibility that the degree of freedom in adjusting the angular distribution of the light BL using the curvature of the lens surface of the first optical system 157 decreases.

To cope with this problem, the light source device 71 according to the present embodiment is further provided with the second optical system 73 which is disposed on the light path of the light BL between the light emitting elements 22 and the first optical system 62 to convert each of the beams of the light BL into the parallel light. Thus, the plurality of beams of the light BL emitted from the plurality of light emitting elements 22 different from each other is prevented from entering a predetermined place on the lens surface of the first optical system 62 from respective direction different from each other. As a result, it is possible to ensure the degree of freedom in adjusting the angular distribution of the light using the curvature of the concave lens constituting the first optical system 62.

Sixth Embodiment

A sixth embodiment of the present disclosure will hereinafter be described using FIG. 15.

The sixth embodiment is substantially the same in basic configurations of a projector and an illumination device as the first embodiment, and is different in configuration of a light source device from the first embodiment. Therefore, the description related to the overall configurations of the projector and the illumination device will be omitted.

Figure 15:
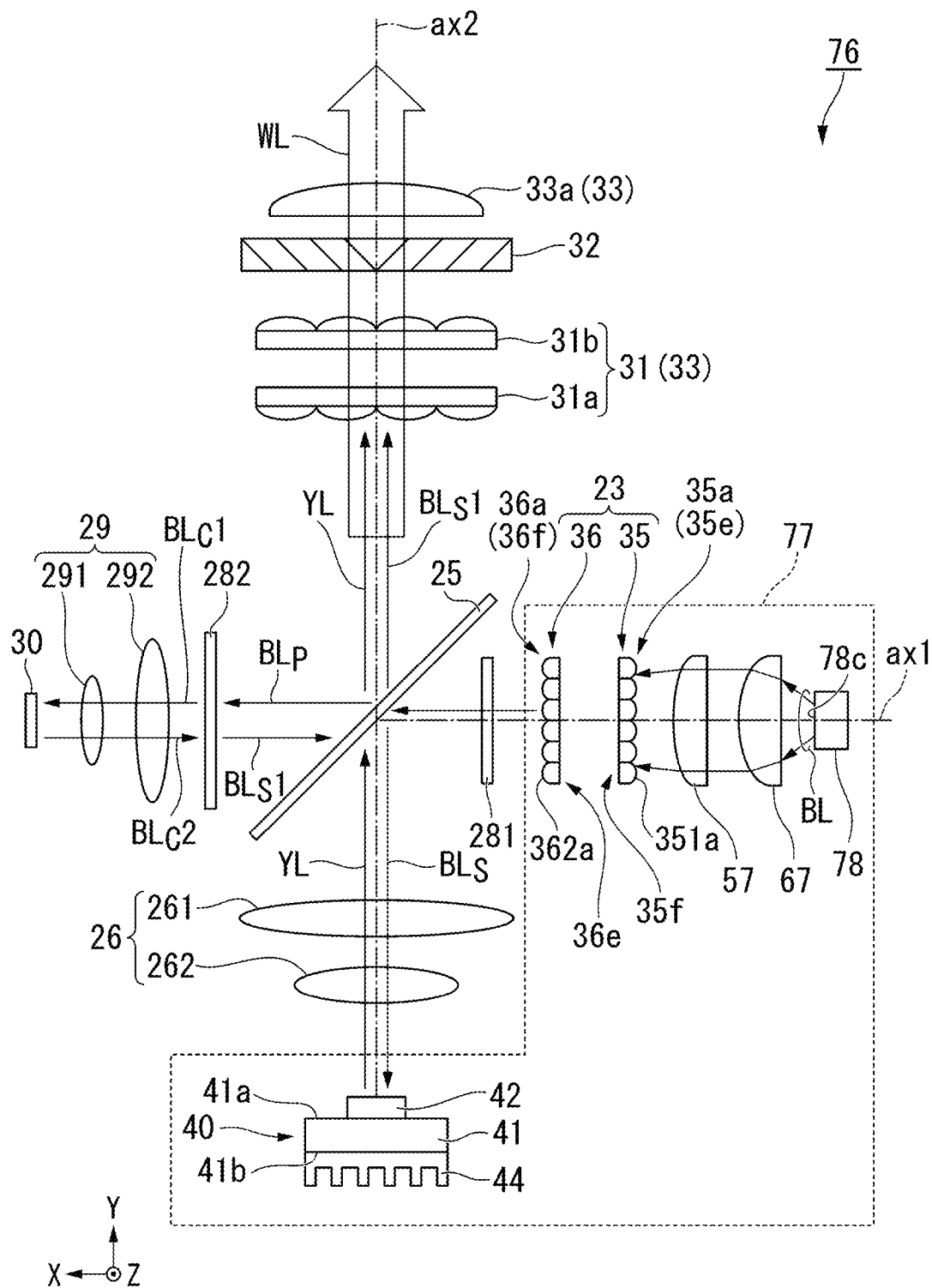
FIG. 15 is a schematic configuration diagram of an illumination device according to a sixth embodiment.

FIG. 15 is a schematic configuration diagram of the illumination device 76 according to the present embodiment.

In FIG. 15, the constituents common to FIG. 2 used in the description of the first embodiment are denoted by the same reference symbols, and the detailed description thereof will be omitted.

As shown in FIG. 15, the illumination device 76 according to the present embodiment is provided with a light source device 77, the first wave plate 281, the polarization split element 25, the first light collection optical system 26, the second wave plate 282, the second light collection optical system 29, the diffusely reflecting element 30, the integrator optical system 31, the polarization conversion element 32, and the superimposing lens 33a.

The light source device 77 according to the present embodiment is provided with a light emitting element 78, the second optical system 67, the first optical system 57, the microlens array 23, and the wavelength conversion element 40.

As shown in FIG. 3, the light source device 20 according to the first embodiment has an edge-emitting semiconductor laser chip having the light emitting area 22c microscopic in area as the light emitting element 22. In contrast, as shown in FIG. 15, the light source device 77 according to the present embodiment has the light emitting element 78 having a light emitting area 78c sufficiently larger in area compared to the light emitting area of the edge-emitting semiconductor layer element such as a surface-emitting laser element. The light emitting element 78 emits the light BL having a predetermined divergence angle from each of places in the light emitting area 78c.

The rest of the configuration of the illumination device 76 is substantially the same as that of the illumination device 2 according to the first embodiment.

Advantages of Sixth Embodiment

Also in the light source device 77 according to the present embodiment, there are obtained substantially the same advantages as those of the first embodiment such as the advantage that it is possible to illuminate the plurality of areas on the wavelength conversion element 40 with low illuminance unevenness, and the advantage that it is possible to suppress the decrease in wavelength conversion efficiency.

Further, the light source device 77 according to the present embodiment is further provided with the first optical system 57 which is disposed on the optical path of the light BL between the light emitting element 78 and the microlens array 23, has the positive power, and converts the incident light BL into the light BL having the angular distribution.

According to this configuration, it is possible to adjust the angular distribution of the light BL which enters the first multi-lens surface 35a by changing the curvature of the convex lens constituting the first optical system 57. Thus, it is possible to obtain substantially the same advantage as that of the second embodiment such as the advantage that it is possible to adjust the intensity distribution of the light with which the plurality of areas on the wavelength conversion layer 42 is irradiated.

In the case of the present embodiment, there is used the light emitting element 78 formed of the surface-emitting laser element or the like, and therefore, when assuming that the second optical system 67 is not provided, the plurality of beams of the light emitted from the places different from each other in the light emitting area 78c enter a predetermined place on the lens surface of the first optical system 57 from the respective directions different from each other similarly to the light source device 171 according to the comparative example described in the fifth embodiment. As a result, there is a possibility that the degree of freedom in adjusting the angular distribution of the light BL using the curvature of the lens surface of the first optical system 57 decreases. In contrast, the light source device 77 according to the present embodiment is further provided with the second optical system 67 which is disposed on the light path of the light BL between the light emitting element 78 and the first optical system 57 to convert the light BL into the parallel light, and is therefore capable of increasing the degree of freedom in adjusting the angular distribution using the curvature of the convex lens constituting the first optical system 57.

Seventh Embodiment

A seventh embodiment of the present disclosure will hereinafter be described using FIG. 16.

The seventh embodiment is substantially the same in basic configurations of a projector and an illumination device as the first embodiment, and is different in configuration of a light source device from the first embodiment. Therefore, the description related to the overall configurations of the projector and the illumination device will be omitted.

Figure 16:
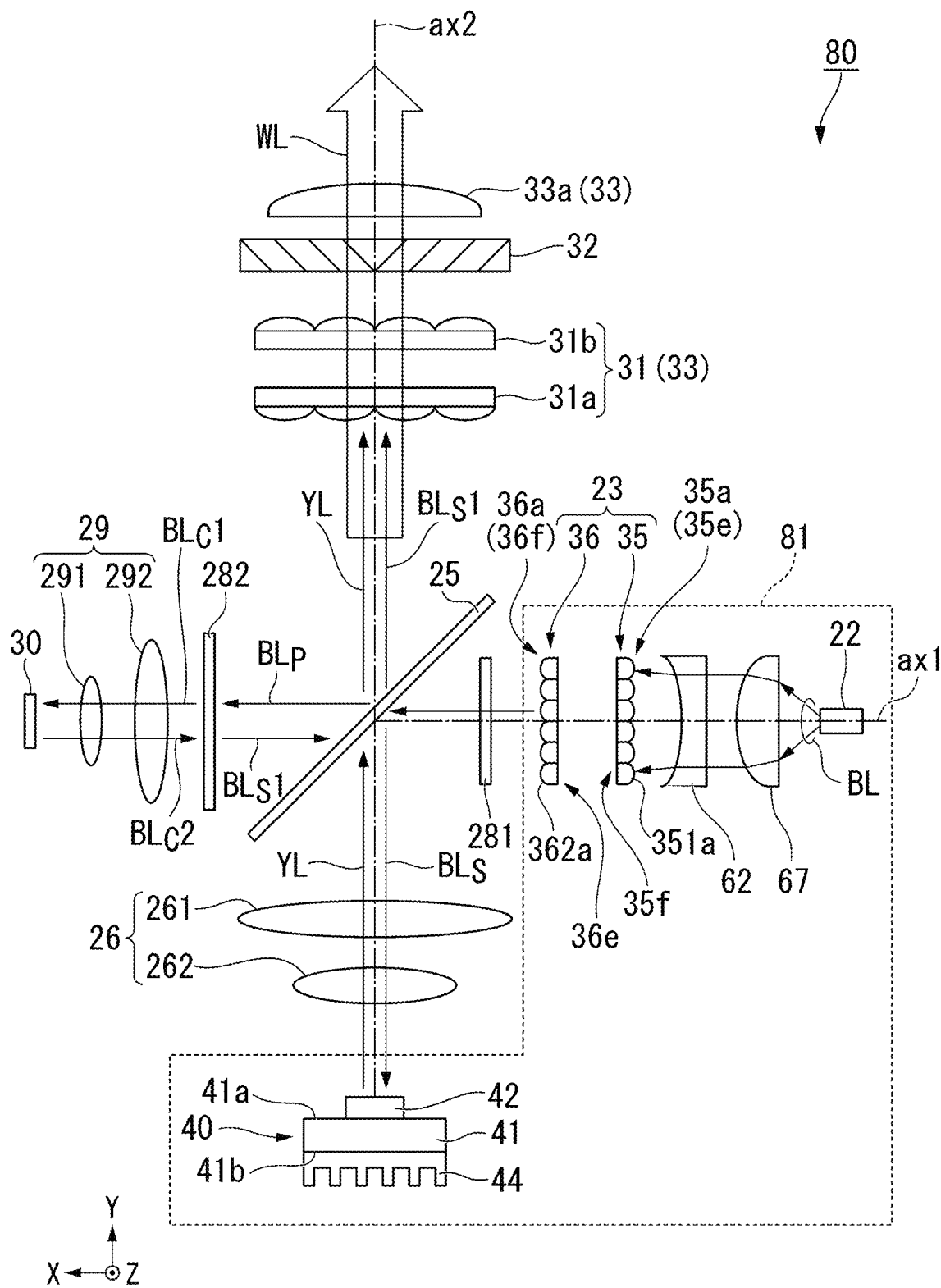
FIG. 16 is a schematic configuration diagram of an illumination device according to a seventh embodiment.

FIG. 16 is a schematic configuration diagram of the illumination device 80 according to the present embodiment.

In FIG. 16, the constituents common to FIG. 2 used in the description of the first embodiment are denoted by the same reference symbols, and the detailed description thereof will be omitted.

As shown in FIG. 16, the illumination device 80 according to the present embodiment is provided with a light source device 81, the first wave plate 281, the polarization split element 25, the first light collection optical system 26, the second wave plate 282, the second light collection optical system 29, the diffusely reflecting element 30, the integrator optical system 31, the polarization conversion element 32, and the superimposing lens 33a.

The light source device 81 according to the present embodiment is provided with the light emitting element 22, the second optical system 67, the first optical system 62, the microlens array 23, and the wavelength conversion element 40.

The first optical system 62 is disposed on the light path of the light BL between the light emitting element 22 and the microlens array 23. The first optical system 62 is formed of a concave lens having negative power. The first optical system 62 converts the light BL collimated by the second optical system 67 into the light BL having the angular distribution. In the case of the present embodiment, since the first optical system 62 has the negative power, the light emitted from the first optical system 62 becomes diverging light, and enters the first multi-lens surface 35a of the microlens array 23 with the angular distribution.

The rest of the configuration of the illumination device 80 is substantially the same as that of the illumination device 2 according to the first embodiment.

Advantages of Seventh Embodiment

Also in the light source device 81 according to the present embodiment, there are obtained substantially the same advantages as those of the first embodiment such as the advantage that it is possible to illuminate the plurality of areas on the wavelength conversion element 40 with low illuminance unevenness, and the advantage that it is possible to suppress the decrease in wavelength conversion efficiency.

Further, the light source device 81 according to the present embodiment is further provided with the first optical system 62 which is disposed on the optical path of the light BL between the light emitting element 22 and the microlens array 23, has the negative power, and converts the incident light BL into the light BL having the angular distribution.

According to this configuration, it is possible to adjust the angular distribution of the light BL which enters the first multi-lens surface 35a by changing the curvature of the concave lens constituting the first optical system 62. Thus, it is possible to obtain substantially the same advantage as that of the second embodiment such as the advantage that it is possible to adjust the intensity distribution of the light BL with which the plurality of areas on the wavelength conversion layer 42 is irradiated.

Further, the light source device 81 according to the present embodiment is further provided with the second optical system 67 which is disposed on the light path of the light BL between the light emitting element 22 and the first optical system 62 to convert the light BL into the parallel light.

According to this configuration, since the light collimated by the second optical system 67 enters the first optical system 62, it is possible to increase the degree of freedom in adjusting the angular distribution using the curvature of the concave lens constituting the first optical system 62.

It should be noted that the scope of the present disclosure is not limited to the embodiments described above, but a variety of modifications can be provided thereto within the scope or the spirit of the present disclosure.

For example, in the embodiments described above, there is cited the example in which the optical element according to an aspect of the present disclosure is applied as a member for illuminating the wavelength conversion element and the diffusely reflecting element of the light source device, but it is possible to apply the optical element to, for example, the integrator optical system 31 shown in FIG. 2 instead of this configuration.

In this case, the illumination target of the optical element is the light modulation devices 4B, 4G, and 4R constituting the projector 1 shown in FIG. 1. The optical element can be applied when, for example, projecting a plurality of windows on the screen, or when displaying an image in which a bright display area and a dark display area are included in one window. By applying the microlens array of the light source device according to an aspect of the present disclosure to the integrator optical system of the projector, it is possible to realize the projector high in use efficiency of the illumination light.

Further, in all of the second embodiment, the third embodiment, the fourth embodiment, the fifth embodiment, the sixth embodiment, and the seventh embodiment, it is possible to apply the microlens array according to the modified example shown in FIG. 6 in which the first lens array and the second lens array are formed of an integrated member.

Further, in the embodiments described above, there is shown the example in which the optical element according to an aspect of the present disclosure is applied to the illumination device having the configuration in which the light emitted from the light source is branched by the polarization split element into two light beams, one of the light beams is made to enter the wavelength conversion element, the other of the light beams is made to enter the diffusely reflecting element, and the fluorescence emitted from the wavelength conversion element and the blue light emitted from the diffusely reflecting element are combined by the polarization split element. Instead of this configuration, it is possible to apply the optical element according to an aspect of the present disclosure to an illumination device having a configuration in which the blue light emitted from the light source is made to enter the wavelength conversion element, a part of the blue light is used as the excitation light, another part of the blue light which does not make a contribution as the excitation light is back-scattered, and the fluorescence emitted from the wavelength conversion element and the blue light are taken out.

Further, in the embodiments described above, there is cited an example of the stationary wavelength conversion element which is not made rotatable, but the aspect of the present disclosure can also be applied to a light source device having a wavelength conversion element which is made rotatable using a motor. Further, there is cited an example of the stationary diffusely reflecting element which is not made rotatable, but the aspect of the present disclosure can also be applied to a light source device having a diffusely reflecting element which is made rotatable using a motor.

Further, although in the embodiments described above, there is described the example of installing the optical element according to the aspect of the present disclosure in the projector using the liquid crystal light valves, the example is not a limitation. The optical element according to the aspect of the present disclosure can be applied to a projector using digital micromirror devices as the light modulation devices. Further, the projector is not required to have a plurality of light modulation devices, and can be provided with just one light modulation device.

Besides the above, the specific configurations of the number, the arrangement, the shape, the material, and so on of each of the constituents constituting the light source device and the projector are not limited to those of the embodiments described above, but can arbitrarily be modified.

Further, although in the embodiments described above, there is described the example of applying the light source device according to an aspect of the present disclosure to the projector, the example is not a limitation. The light source device according to an aspect of the present disclosure can also be applied to a light source device such as lighting equipment or a headlight of a vehicle. In this case, it is possible for the light source device of this kind to be provided with a light source, the optical element according to an aspect of the present disclosure, and a light modulation element for adjusting the illuminance of the light emitted from the optical element.

It is also possible for a light source device according to an aspect of the present disclosure to have the following configuration.

The light source device according to the aspect of the present disclosure includes a light emitting element configured to emit light, and a microlens array having a first multi-lens surface which the light emitted from the light emitting element enters, and a second multi-lens surface configured to emit the light which enters through the first multi-lens surface, wherein the light enters the first multi-lens surface with an angular distribution, the first multi-lens surface has a plurality of first cells arranged in an array, the second multi-lens surface has a plurality of second cells arranged in an array, light proceeding from one of the first cells toward the second multi-lens surface has a first light beam which enters one of the second cells, and a second light beam which enters another of the second cells different from the second cell which the first light beam enters, a first area of an illumination target is irradiated with the first light beam, and a second area of the illumination target different from the first area is irradiated with the second light beam.

In the light source device according to the aspect of the present disclosure, the light emitting element may emit the light having an angular distribution.

In the light source device according to the aspect of the present disclosure, there may further be included a first optical system which is disposed on a light path of the light between the light emitting element and the microlens array, which has positive power, and which is configured to convert the light into light having an angular distribution.

In the light source device according to the aspect of the present disclosure, there may further be included a first optical system which is disposed on a light path of the light between the light emitting element and the microlens array, which has negative power, and which is configured to convert the light into light having an angular distribution.

In the light source device according to the aspect of the present disclosure, there may further be included a second optical system which is disposed on a light path of the light between the light emitting element and the first optical system, and which is configured to convert the light into parallel light.

In the light source device according to the aspect of the present disclosure, there may further be included a wavelength conversion element, wherein the light emitted by the light emitting element may be excitation light, the excitation light may enter the microlens array, and the excitation light emitted from the microlens array may enter the wavelength conversion element, and the wavelength conversion element may perform wavelength conversion on the excitation light to emit fluorescence.

In the light source device according to the aspect of the present disclosure, the illumination target may be the wavelength conversion element, the first area may be a central portion of the wavelength conversion element, the second area may be a rim portion of the wavelength conversion element, and an illuminance of the first light beam in the first area may be lower than an illuminance of the second light beam in the second area.

In the light source device according to the aspect of the present disclosure, there may further be included a light modulation element configured to modulate light emitted from the microlens array.

It is also possible for an image display device according to another aspect of the present disclosure to have the following configuration.

The image display device according to another aspect of the present disclosure includes the light source device according to the aspect of the present disclosure, and a light modulation device configured to modulate light emitted from the light source device in accordance with image information.

It is possible for a projector according to still another aspect of the present disclosure to have the following configuration.

The projector according to still another aspect of the present disclosure includes the light source device according to the aspect of the present disclosure, a light modulation device configured to modulate light emitted from the light source device in accordance with image information, and a projection optical device configured to project the light modulated by the light modulation device.

What is claimed is:

1. A light source device comprising:
a light emitting element configured to emit light; and
a microlens array having a first multi-lens surface which the light emitted from the light emitting element enters, and
a second multi-lens surface configured to emit the light which enters through the first multi-lens surface and
a first optical system disposed on a light path of the light between the light emitting element and the microlens array, the first optical system having positive power and being configured to convert the light which enters the first optical system into light having an angular distribution, wherein
the light which enters the first multi-lens surface has the angular distribution,
the first multi-lens surface has a plurality of first cells arranged in an array,
the second multi-lens surface has a plurality of second cells arranged in an array,
light proceeding from one of the first cells toward the second multi-lens surface has a first light beam which enters one second cell, and a second light beam which enters another second cell different from the one second cell,
a first area of an illumination target is irradiated with the first light beam, and
a second area of the illumination target different from the first area is irradiated with the second light beam.

2. The light source device according to claim 1, wherein the light emitting element emits the light having the angular distribution.

3. The light source device according to claim 1, further comprising:
a second optical system disposed on a light path of the light between the light emitting element and the first optical system, the first optical system being configured to convert the light which enters the second optical system into parallel light.

4. The light source device according to claim 1, further comprising:
a light modulation element configured to modulate light emitted from the microlens array.

5. An image display device comprising:
the light source device according to claim 1; and
a light modulation device configured to modulate light emitted from the light source device in accordance with image information.

6. A projector comprising:
the light source device according to claim 1;
a light modulation device configured to modulate light emitted from the light source device in accordance with image information; and
a projection optical device configured to project the light modulated by the light modulation device.

7. A light source device comprising:
a light emitting element configured to emit light;
a microlens array having a first multi-lens surface which the light emitted from the light emitting element enters, and a second multi-lens surface configured to emit the light which enters through the first multi-lens surface; and
a first optical system disposed on a light path of the light between the light emitting element and the microlens array, the first optical system having negative power and being configured to convert the light which enters the first optical system into light having an angular distribution, wherein
the light which enters the first multi-lens surface has the angular distribution,
the first multi-lens surface has a plurality of first cells arranged in an array,
the second multi-lens surface has a plurality of second cells arranged in an array,
light proceeding from one of the first cells toward the second multi-lens surface has a first light beam which enters one second cell, and
a second light beam which enters another second cell different from the one second cell,
a first area of an illumination target is irradiated with the first light beam, and a second area of the illumination target different from the first area is irradiated with the second light beam.

8. The light source device according to claim 7, wherein the light emitting element emits the light having the angular distribution.

9. The light source device according to claim 7, further comprising:
a second optical system disposed on a light path of the light between the light emitting element and the first optical system, the first optical system being configured to convert the light which enters the second optical system into parallel light.

10. The light source device according to claim 7, further comprising:
a light modulation element configured to modulate light emitted from the microlens array.

11. An image display device comprising:
the light source device according to claim 4; and
a light modulation device configured to modulate light emitted from the light source device in accordance with image information.

12. A projector comprising:
the light source device according to claim 7;
a light modulation device configured to modulate light emitted from the light source device in accordance with image information; and
a projection optical device configured to project the light modulated by the light modulation device.

13. A light source device comprising:
a light emitting element configured to emit light;
a microlens array having a first multi-lens surface which the light emitted from the light emitting element enters, and a second multi-lens surface configured to emit the light which enters through the first multi-lens surface; and
a wavelength conversion element, wherein
the light emitted from the light emitting element is excitation light,
the excitation light enters the microlens array,
the wavelength conversion element is configured to convert a wavelength of the excitation light emitted from the microlens array and emit fluorescence,
the illumination target is the wavelength conversion element,
the first area is a central portion of the wavelength conversion element,
the second area is a rim portion of the wavelength conversion element, and
an illuminance of the first light beam in the first area is lower than an illuminance of the second light beam in the second area.

14. The light source device according to claim 13, wherein
the light emitting element emits the light having the angular distribution.

15. The light source device according to claim 13, further comprising:
a second optical system disposed on a light path of the light between the light emitting element and a first optical system, the first optical system being configured to convert the light which enters the second optical system into parallel light.

16. The light source device according to claim 13, further comprising:
a light modulation element configured to modulate light emitted from the microlens array.

17. An image display device comprising:
the light source device according to claim 13; and
a light modulation device configured to modulate light emitted from the light source device in accordance with image information.

18. A projector comprising:
the light source device according to claim 13;
a light modulation device configured to modulate light emitted from the light source device in accordance with image information; and
a projection optical device configured to project the light modulated by the light modulation device.

* * * * *